(12) United States Patent
Toepke et al.

(10) Patent No.: US 10,270,853 B2
(45) Date of Patent: Apr. 23, 2019

(54) PROCESS CONTROL COMMUNICATION BETWEEN A PORTABLE FIELD MAINTENANCE TOOL AND AN ASSET MANAGEMENT SYSTEM

(71) Applicant: FISHER-ROSEMOUNT SYSTEMS, INC., Round Rock, TX (US)

(72) Inventors: Todd M. Toepke, Eden Prairie, MN (US); Joseph D. Fisher, Minnetonka, MN (US); James R. Logerquist, Maple Grove, MN (US); Alan R. Dewey, Plymouth, MN (US); Alden C. Russell, III, Minnetonka, MN (US); Laura Briggs, Eagan, MN (US); Ronald Hempel, Inver Grove Heights, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 370 days.

(21) Appl. No.: 15/279,884

(22) Filed: Sep. 29, 2016

(65) Prior Publication Data

US 2018/0027071 A1 Jan. 25, 2018

Related U.S. Application Data

(63) Continuation-in-part of application No. 15/217,112, filed on Jul. 22, 2016.

(51) Int. Cl.
*G06F 15/173* (2006.01)
*H04L 29/08* (2006.01)
*H04L 29/06* (2006.01)

(52) U.S. Cl.
CPC .......... *H04L 67/1095* (2013.01); *H04L 67/12* (2013.01); *H04L 63/0209* (2013.01); *H04L 63/104* (2013.01); *H04L 67/1074* (2013.01)

(58) Field of Classification Search
CPC ....... H04L 67/104; H04L 41/12; H04L 51/38; H04L 67/12; H04L 69/08; H04L 69/22;
(Continued)

(56) References Cited

U.S. PATENT DOCUMENTS 5,999,740 A 12/1999 Rowley
6,035,423 A 3/2000 Hodges et al.
(Continued)

FOREIGN PATENT DOCUMENTS

CN 101410800 A 4/2009
EP 1 816 530 A1 8/2007
(Continued)

OTHER PUBLICATIONS

Beamex MC5 (discontinued) description, Retrieved from the Internet at http://www.beamex.com/beamex_products/MC5-%28discounted%29/na15ghgl/355ca6b7-66ff-469f-9bd4-1f26c0870452#Features (Jul. 8, 2016).
(Continued)

*Primary Examiner* — Imad Hussain
(74) *Attorney, Agent, or Firm* — Marshall, Gerstein & Borun LLP

(57) ABSTRACT

A platform-to-platform communication architecture for a process control messaging service in a process control system or other industrial setting allows stationary and portable industrial computing units to communicate with each other, in one-to-one and one-to-many communications, and across networks, including isolated networks inside the process control system or industrial setting and external networks. A requesting industrial computing device platform generates a message for a destination, or responding, industrial computing device in the communication protocol of the destination platform, and wraps the message in a communication protocol of the process control messaging service.
(Continued)

The communication architecture decodes the wrapped message into the communication protocol of the destination industrial computing device and forwards the decoded wrapped message to the destination. The communication architecture allows for a variety of communication services, including, but not limited to, instant/real-time peer-to-peer messaging, time synchronization, automatic data transfer with an asset management system, communication with field devices via an asset management system and large data transfers.

32 Claims, 20 Drawing Sheets

(58) Field of Classification Search
CPC .............. H04L 69/321; G05B 19/4185; G04L 41/0806
USPC ........................................................ 709/222
See application file for complete search history.

(56) References Cited

U.S. PATENT DOCUMENTS

| | | | |
|---|---|---|---|
| 6,282,709 B1 | 8/2001 | Reha et al. | |
| 6,301,527 B1* | 10/2001 | Butland | G05B 19/042 700/286 |
| 6,453,207 B1* | 9/2002 | Holmes | G05B 15/02 700/108 |
| 6,704,737 B1* | 3/2004 | Nixon | G05B 19/4145 707/656 |
| 6,889,166 B2 | 5/2005 | Zielinski et al. | |
| 7,010,294 B1 | 3/2006 | Pyotsia et al. | |
| 7,016,741 B2 | 3/2006 | Arntson | |
| 7,051,143 B2* | 5/2006 | White, III | G05B 19/4185 709/249 |
| 7,177,122 B2 | 2/2007 | Hou et al. | |
| 7,227,656 B1 | 6/2007 | Kato | |
| 7,289,994 B2 | 10/2007 | Nixon et al. | |
| 7,328,078 B2 | 2/2008 | Sanford et al. | |
| 7,421,531 B2 | 9/2008 | Rotvold et al. | |
| 7,539,978 B1 | 5/2009 | Haddox et al. | |
| 7,620,948 B1 | 11/2009 | Rowe et al. | |
| 7,675,932 B2 | 3/2010 | Schumacher | |
| 7,839,890 B1* | 11/2010 | Neitzel | H04L 29/06 370/229 |
| 7,840,296 B2 | 11/2010 | Sanford et al. | |
| 7,975,266 B2 | 7/2011 | Schneider et al. | |
| 8,055,371 B2 | 11/2011 | Sanford et al. | |
| 8,127,241 B2 | 2/2012 | Blevins et al. | |
| 8,200,702 B2* | 6/2012 | Herbeck | G06F 17/30722 707/791 |
| 8,204,717 B2 | 6/2012 | McLaughlin et al. | |
| 8,286,154 B2 | 10/2012 | Kaakani et al. | |
| 8,458,659 B2 | 6/2013 | Resnick et al. | |
| 8,626,916 B2 | 1/2014 | Armstrong et al. | |
| 8,766,794 B2 | 7/2014 | Ferguson et al. | |
| 8,782,249 B1* | 7/2014 | Hood | G05B 19/4185 709/227 |
| 9,003,387 B2 | 4/2015 | Van Camp et al. | |
| 9,244,455 B2 | 1/2016 | Peterson et al. | |
| 9,582,259 B2* | 2/2017 | Chee | G06F 8/61 |
| 2004/0039458 A1 | 2/2004 | Mathiowetz et al. | |
| 2004/0054829 A1* | 3/2004 | White, III | G05B 19/4185 710/105 |
| 2004/0103165 A1* | 5/2004 | Nixon | H04W 72/02 709/217 |
| 2004/0172207 A1* | 9/2004 | Hancock | G01R 19/2513 702/60 |
| 2004/0181787 A1 | 9/2004 | Wickham et al. | |
| 2004/0230401 A1 | 11/2004 | Duren et al. | |
| 2005/0132349 A1 | 6/2005 | Roberts et al. | |
| 2005/0228798 A1* | 10/2005 | Shepard | G06F 8/65 |
| 2007/0004168 A1 | 1/2007 | Zips | |
| 2007/0022403 A1 | 1/2007 | Brandt et al. | |
| 2007/0118699 A1 | 5/2007 | Synard et al. | |
| 2007/0169079 A1 | 7/2007 | Keller et al. | |
| 2007/0186010 A1* | 8/2007 | Hall | H04L 12/4625 709/246 |
| 2007/0288551 A1* | 12/2007 | Sidon | H04L 51/38 709/203 |
| 2008/0040449 A1 | 2/2008 | Grant et al. | |
| 2008/0049984 A1 | 2/2008 | Poo et al. | |
| 2008/0126005 A1 | 5/2008 | Guenter et al. | |
| 2008/0126665 A1* | 5/2008 | Burr | G05B 19/042 710/316 |
| 2008/0268784 A1 | 10/2008 | Kantzes et al. | |
| 2009/0052429 A1* | 2/2009 | Pratt, Jr. | G01D 21/00 370/350 |
| 2009/0065578 A1* | 3/2009 | Peterson | G05B 19/048 235/382 |
| 2009/0094462 A1 | 4/2009 | Madduri | |
| 2009/0133012 A1 | 5/2009 | Shih | |
| 2009/0138870 A1 | 5/2009 | Shahindoust et al. | |
| 2009/0271726 A1* | 10/2009 | Gavimath | G05B 19/0423 715/771 |
| 2009/0320125 A1 | 12/2009 | Pleasant, Jr. et al. | |
| 2010/0077111 A1* | 3/2010 | Holmes | H04L 12/40013 710/33 |
| 2010/0146497 A1 | 6/2010 | Kogan et al. | |
| 2010/0149997 A1* | 6/2010 | Law | G05B 19/4185 370/248 |
| 2011/0078114 A1* | 3/2011 | Herbeck | G06F 17/30011 707/638 |
| 2011/0087461 A1 | 4/2011 | Hollander et al. | |
| 2011/0153786 A1* | 6/2011 | Merkel | G05B 19/4186 709/220 |
| 2011/0224808 A1 | 9/2011 | Lucas et al. | |
| 2012/0038760 A1 | 2/2012 | Kantzes et al. | |
| 2012/0087656 A1* | 4/2012 | Rourke | H04L 12/40045 398/43 |
| 2012/0236769 A1* | 9/2012 | Powell | G05B 19/0426 370/310 |
| 2013/0024495 A1 | 1/2013 | Armstrong et al. | |
| 2013/0070745 A1* | 3/2013 | Nixon | H04L 45/74 370/338 |
| 2013/0151849 A1* | 6/2013 | Graham | H04L 9/32 713/164 |
| 2013/0214898 A1 | 8/2013 | Pineau et al. | |
| 2014/0018955 A1 | 1/2014 | Asakawa et al. | |
| 2014/0019768 A1 | 1/2014 | Pineau et al. | |
| 2014/0036911 A1* | 2/2014 | Edgar | H04L 69/03 370/389 |
| 2014/0047107 A1 | 2/2014 | Maturana et al. | |
| 2014/0056173 A1 | 2/2014 | Nakamura et al. | |
| 2014/0181955 A1 | 6/2014 | Rosati | |
| 2014/0273847 A1 | 9/2014 | Nixon et al. | |
| 2014/0314087 A1* | 10/2014 | Kusano | H04L 69/18 370/392 |
| 2015/0024710 A1 | 1/2015 | Becker et al. | |
| 2015/0040179 A1* | 2/2015 | Sobel | H04L 63/0876 726/1 |
| 2015/0098158 A1 | 4/2015 | Kemp et al. | |
| 2015/0127876 A1* | 5/2015 | Erni | G05B 19/4185 710/315 |
| 2015/0156285 A1* | 6/2015 | Blair | H04L 12/4633 709/201 |
| 2015/0156286 A1* | 6/2015 | Blair | H04L 12/4625 709/201 |
| 2015/0281227 A1 | 10/2015 | Fox Ivey et al. | |
| 2016/0026813 A1 | 1/2016 | Neitzel et al. | |
| 2016/0076664 A1* | 3/2016 | Erni | F16K 37/0075 700/282 |
| 2016/0132046 A1 | 5/2016 | Beoughter et al. | |
| 2016/0154394 A1 | 6/2016 | Peterson et al. | |
| 2016/0299175 A1 | 10/2016 | Dewey et al. | |
| 2017/0078265 A1 | 3/2017 | Sundaresh et al. | |
| 2017/0093884 A1* | 3/2017 | Al Abdulhadi | H04L 69/321 |
| 2017/0171096 A1* | 6/2017 | Bunte | H04L 47/625 |
| 2017/0180355 A1* | 6/2017 | Enns | H04L 63/06 |

(56) References Cited

U.S. PATENT DOCUMENTS

| | | | |
|---|---|---|---|
| 2017/0257378 A1 | 9/2017 | Sprenger et al. | |
| 2017/0322850 A1* | 11/2017 | Yang | H04L 67/1095 |
| 2018/0210428 A1* | 7/2018 | Jundt | H04L 67/12 |

FOREIGN PATENT DOCUMENTS

| | | |
|---|---|---|
| EP | 1 906 623 A1 | 4/2008 |
| EP | 2 026 223 A2 | 2/2009 |
| EP | 2 067 088 A2 | 6/2009 |
| EP | 2 782 073 A1 | 9/2014 |
| GB | 2 465 495 A | 5/2010 |
| GB | 2 535 839 A | 8/2016 |
| GB | 2 539 311 A | 12/2016 |
| GB | 2 548 007 A | 9/2017 |
| JP | 2002-007129 A | 1/2002 |
| JP | 2004-234056 A | 8/2004 |
| JP | 2009-187420 A | 8/2009 |
| WO | WO-2008/045258 A2 | 4/2008 |
| WO | WO-2013/184117 A1 | 12/2013 |
| WO | WO-2016/020165 A1 | 2/2016 |
| WO | WO-2017/085923 A1 | 5/2017 |

OTHER PUBLICATIONS

Beamex MC6 Advanced Field Calibrator and Communicator, Product Brochure (2016).
Costall, "Essential Concepts of Intrinsic Safety," Spark Institute. Retrieved from the internet at http://www.sparkinstitute.ca/wp/WP00 - Essential_Concepts_of_Intrinsic_Safety.pdf (May 24, 2016).
Emerson Process Management, "475 Field Communicator." Retrieved from the internet at http://www2.emersonprocess.com/siteadmincenter/PM%20Asset%20Optimization%20Documents/ProductReferenceAndGuides/475_ru_usermanual.pdf (May 26, 2016).
Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
Fieldbus Engineer's Guide, Pepperl+Fuchs (May 2013), 474 pages.
Fieldbus Foundation, "Foundation Fieldbus Application Guide; 31,25 kbit/s Intrinsically Safe Systems." Retrieved from the internet at http://www.fieldbus.org/images/stories/enduserresources/technicalreferences/documents/instrinsciallysafesystems.pdf (May 26, 2016).
First Office Action for corresponding Chinese Patent Application No. 201010572412.4, dated Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Office Action for corresponding Japanese Patent Application No. 2010-215391, dated Aug. 19, 2014, 4 pgs.
Omega, "Digital Signal Transmission." Retrieved from the internet at https://www.omega.com/literature/transactions/volume2/digitalsignal4.html (May 26, 2016).
Omega, "Understanding What's Meant by Intrinsically Safe." Retrieved from the internet at http://www.omega.com/technical-learning/understanding-what-is-meant-by-intrinsically-safe.html (May 26, 2016).
Search Report for Application No. GB1015879.8, dated Jan. 13, 2011.
U.S. Appl. No. 14/682,714, filed Apr. 9, 2015.
U.S. Appl. No. 15/214,949, filed Jul. 20, 2016.
U.S. Appl. No. 15/214,975, filed Jul. 20, 2016.
U.S. Appl. No. 15/216,810, filed Jul. 22, 2016.
User Manual for Beamex® MC6 Advanced Field Calibrator and Communicator (2012-2015).
Wikipedia, "Intrinsic Safety." Retrieved from the internet at https://en.wikipedia.org/wikl/intrinsic_safety (May 24, 2016).
Wiring and Installation 31.25 kbit/s, Voltage Mode, Wire Medium, Application Guide, FoundationTM Fieldbus, © 1996 Fieldbus Foundation.
Search Report for Application No. GB1709952.4, dated Nov. 29, 2017.
Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.

* cited by examiner

930
PERMISSIONS

| PERMISSION ID | DEVICE | ACCESS TYPES | PLANT AREA | FUNCTIONS | DURATION |
|---|---|---|---|---|---|
| 1 | FIELD DEVICE A | R, R/W | A | CONFIGURATION, TROUBLESHOOT, CALIBRATE | ∞ |
| 2 | FIELD DEVICE B | R | B | MONITOR | 30 MIN. |

FIG. 14A

950
USERS

| USER ID | JOB FUNCTION | SECURITY GROUP | PERMISSIONS |
|---|---|---|---|
| 0001 | CONFIGURATION ENGINEER | 1, 2 | 1, 2, 3, 4 |
| 0002 | MAINTENANCE TECHNICIAN | 3 | 3, 5, 6, 8 |

FIG. 14B

PROCESS CONTROL COMMUNICATION BETWEEN A PORTABLE FIELD MAINTENANCE TOOL AND AN ASSET MANAGEMENT SYSTEM

RELATED APPLICATIONS

This application is a continuation-in-part of U.S. application Ser. No. 15/217,112, entitled "Process Control Communication Architecture," filed on Jul. 22, 2016, the entire disclosure of which is hereby expressly incorporated by reference herein.

TECHNICAL FIELD

The present disclosure relates generally to process control systems, and, more particularly, to a process control communication between a portable field maintenance tool and an asset management system.

BACKGROUND

Distributed process control systems, like those used in chemical, petroleum or other processes, typically include one or more process controllers and input/output (I/O) devices communicatively coupled to at least one host or operator workstation and to one or more field devices via analog, digital or combined analog/digital buses, or via a wireless communication link or network.

A process controller (sometimes referred to as a "controller"), which is typically located within the plant or other industrial environment, receives signals (sometimes referred to as "control inputs") indicative of process measurements and uses the information carried by these signals to implement control routines that cause the controller to generate control signals (sometimes referred to as "control outputs") based on the control inputs and the internal logic of the control routines. The controllers send the generated control signals over buses or other communication links to control operation of field devices. In some instances, the controllers may coordinate with control routines implemented by smart field devices, such as Highway Addressable Remote Transmitter (HART®), WirelessHART®, and FOUNDATION® Fieldbus (sometimes just called "Fieldbus") field devices. Moreover, in many cases, there may be plant or other industrial equipment that operates in the plant or other industrial setting to perform some function that is not under direct control of the process controller, such as vibration detection equipment, rotating equipment, electrical power generating equipment, etc.

The field devices that are typically associated with controller, which may be, for example, valves, valve positioners, switches, and transmitters (e.g., temperature, pressure, level and flow rate sensors), are located within the process environment and generally perform physical or process control functions. For example, a valve may open or close in response to a control output received from a controller, or may transmit to a controller a measurement of a process parameter so that the controller can utilize the measurement as a control input. Smart field devices, such as field devices conforming to the well-known Fieldbus protocol may also perform control calculations, alarming functions, and other control functions commonly implemented within a controller. Field devices may be configured to communicate with controllers and/or other field devices according to various communication protocols. For example, a plant may include traditional analog 4-20 mA field devices, HART® field devices, Fieldbus field devices, and/or other types of field devices.

The process controllers receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the operator interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

Traditional analog 4-20 mA field devices communicate with a controller via a two-wire communication link (sometimes called a "loop" or "current loop") configured to carry a 4-20 mA DC signal indicative of a measurement or control command. For example, a level transmitter may sense a tank level and transmit via the loop a current signal corresponding to that measurement (e.g., a 4 mA signal for 0% full, a 12 mA signal for 50% full, and a 20 mA signal for 100% full). The controller receives the current signal, determines the tank level measurement based on the current signal, and takes some action based on the tank level measurement (e.g., opening or closing an inlet valve). Analog 4-20 mA field devices typically come in two varieties including four-wire field devices and two-wire field devices. A four-wire field device typically relies on a first set of wires (i.e., the loop) for communication, and a second set of wires for power. A two-wire field device relies on the loop for both communication and power. These two-wire field devices may be called "loop powered" field devices.

Process plants often implement traditional 4-20 mA systems due to the simplicity and effectiveness of the design. Unfortunately, traditional 4-20 mA current loops only transmit one process signal at a time. Thus, a set-up including a control valve and a flow transmitter on a pipe carrying material may require three separate current loops: one for carrying a 4-20 mA signal indicative of a control command for the valve (e.g., to move the valve to 60% open); a second for carrying a 4-20 mA signal indicative of the valve's actual position (e.g., so that the controller knows the degree to which the valve has responded to control commands); and a third for carrying a 4-20 mA signal indicative of a measured flow. As a result, a traditional 4-20 mA set-up in a plant having a large number of field devices may require extensive wiring, which can be costly and can lead to complexity when setting up and maintaining the communication system.

More recently, the process control industry has moved to implement digital communications within the process control environment. For example, the HART® protocol uses the loop DC magnitude to send and receive analog signals, but also superimposes an AC digital carrier signal on the DC signal to enable two-way field communications with smart field instruments. As another example, the Fieldbus protocol provides all-digital communications on a two-wire bus (sometimes called a "segment" or "Fieldbus segment"). This two-wire Fieldbus segment can be coupled to multiple field devices to provide power to the multiple field devices (via a DC voltage available on the segment) and to enable communication by the field devices (via an AC digital communication signal superimposed on the DC power supply voltage). Generally speaking, because the connected field devices use the same segment for communication and are connected in parallel, only one field device can transmit a message at any given time over the segment. Accordingly, communication on a segment is coordinated by a device designated as a link active scheduler (LAS). The LAS is responsible for passing a token between field devices connected to the segment. Only the device with the token may communicate over the segment at a particular time.

These digital communication protocols generally enable more field devices to be connected to a particular communication link, support more and faster communications between the field devices and the controller, and/or allow field devices to send more and different types of information (such as information pertaining to the status and configuration of the field device itself) to the process controller and other devices in or connected to the control network. Furthermore, these standard digital protocols enable field devices made by different manufacturers to be used together within the same process control network.

Regardless of the communication protocol utilized, field devices may require on-site setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair.

Generally speaking, configuration and testing of field devices are performed on location using a handheld maintenance tool, such as a portable testing device ("PTD"). Because many field devices are installed in remote, hard-to-reach locations, it is more convenient for a user to test the installed devices in such remote locations using a PTD rather than using a full configuration and testing device, which can be heavy, bulky, and non-portable, generally requiring the installed field device to be transported to the site of the diagnostic device.

Regardless of the communication protocol utilized, field devices may require setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair. Operators use industrial computing devices to configure, troubleshoot, calibrate, analyze and perform other operations on process control devices (e.g., controllers, field devices, etc.). In some known systems, an operator may conduct a number of analyses and/or management of a field device using a stationary industrial computing device (e.g., a personal computer, workstations, etc.) to perform asset management, vibration management, industrial computing device fleet management, etc.

On the other hand, configuration and testing of field devices may be performed on location using a portable industrial computing device, such as a handheld field communicator, calibrator, portable testing device ("PTD"), etc. An operator may physically attach the portable industrial computing device to a field device and may then communicate with the field device via the portable industrial computing device for diagnostics, to change the configuration, to calibrate the field device, etc. For example, because many field devices are installed in remote, hard-to-reach locations, it is more convenient for a user to test the installed devices in such remote locations using a PTD rather than using a full configuration and testing device, such as a stationary industrial computing device, which can be heavy, bulky, and non-portable, generally requiring the installed field device to be transported to the site of the diagnostic device.

When a user, such as a service technician, performs maintenance testing and/or communications with a field device, the PTD is typically communicatively connected to a communication link (e.g., a current loop or Fieldbus segment) or directly to a field device (e.g., via communication terminals of the field device). The PTD initially attempts to communicate with the field device, such as by sending and/or receiving digital communication signals along the loop or segment using the communication protocol supported by the field device. If the current loop or segment is in proper operating condition, the communications signals may be sent and/or received without problem. However, if the loop, segment, or field device contains an electrical fault, such as a short or a break, communications may be impeded, and it may be necessary to diagnose the loop, segment, and/or field device to identify the fault.

When such a fault is identified, a technician might need to use a variety of other tools to test the field device and/or communication link. For example, the technician may need to use a portable power supply to power an isolated field device. The technician may need to power an isolated field device, for example, when the field device loses power due to a plant-wide power outage or due to an issue with a local power supply. As another example, the technician may simply need to take a field device offline for troubleshooting in order to avoid negatively effecting other field devices and the rest of the process control system. The technician may also need to carry a multi-meter to measure the current, voltage, resistance, impedance, etc. available on a segment or loop, etc. Each of these tools can take up a fair amount of space, and may be inconvenient for a technician to carry in the field. To address this problem with carrying multiple tools, manufacturers have developed PTDs that include a power supply for providing power to a HART loop. Unfortunately, these powered PTDs are typically incapable of providing power to Fieldbus field devices. Further, typical portable power supplies and powered PTDs often fail to comply with Intrinsic Safety (IS) standards, and thus cannot be safely used in hazardous areas (e.g., environments or atmospheres that are potentially explosive due to the presence of explosive gas or dust).

Still further, if a field device is located in a hazardous area, the technician may need to verify that each of his or her tools operates in an intrinsically safe manner. Thus, when in a hazardous area, a technician's tools may need to comply with IS standards to ensure safe operation. Generally speaking, IS standards impose restrictions on electrical equipment and wiring in hazardous environments to ensure that the electrical equipment and wiring does not ignite an explosion. To comply with IS standards, electrical equipment generally needs to be designed with two core concepts in mind: energy limitation and fault tolerance. In any event, the requirement for IS compliance in some uses has led to the development of another set of field maintenance tools that may work with one of the field device protocols mentioned above, or others, but that is also IS compliant.

Likewise, as mentioned above, most process plants and other industrial settings (such as oil well drilling platforms, pumping stations, etc.) include other industrial equipment, such as rotating equipment, power generating or conversion equipment, vibration analyzer equipment, etc. that needs to be set up, configured, and maintained within the plant or industrial setting. A still further set of field maintenance tools may be needed to support this equipment, including configuring the equipment, testing the equipment, etc.

These types of industrial computing devices often need to communicate and exchange data in a secure and reliable manner, with proper authorization, and this need is rapidly increasing to support ever increasing capabilities and applications, which highlights a number of specific needs related to communications and data exchange within the process control system (i.e., in-plant) separate from the data highway of communications between a control room and process control devices. Although information technology (IT) infrastructure, such as Transmission Control Protocol/Internet Protocol (TCP/IP), authentication, Active Directory, etc., exists in these industrial settings, additional mechanisms and services are needed to provide additional security and access control authorization. Also, addition mechanisms and services are needed to support the communications, messaging, data transfer, and other capabilities of additional process control system applications.

SUMMARY

The present disclosure describes a communication architecture that provides a secure, reliable way to communicate between an external cloud, personal computers, industrial computing devices, etc. to other industrial computing devices (e.g., field communicators, PTDs, calibrators, etc.) in a process control system, process plant or other industrial settings. These communications include large data file transfer, real-time messaging, data synchronization, authentication and authorization, automated asset management data transfer, communication with a process instrument via an asset management system, and portable industrial computing device fleet management.

The communication architecture further provides security mechanisms, including additional levels of authorization beyond standard information technology security, in order to meet current and future security needs in process control systems, process plants or other industrial settings. In addition, the architecture provides many-to-many communications, file transfers, and operations among industrial computing devices. The communication architecture operates with protocol independence, such that it works with a number of different protocol and physical layer technologies, including WiFi, USB, etc. The communication architecture also operates with device type independence, such that it works with diverse stationary and portable industrial computing devices, and with application independence, such that it works with services for a wide range of software applications.

As a feature of the communication architecture, an asset management application may be enabled with the functionality to perform automatic synchronization of data between itself and an industrial computing device. In one implementation, the asset management application may have the capability to synchronize data between itself and an industrial computing device in real time as changes are being made to the data by the industrial computing device while the industrial computing device is connected to the asset management application using the communication architecture. Alternatively, the asset management application may have the capability to periodically and automatically synchronize data between itself and an industrial computing device whenever the industrial computing device connects to a process control messaging system defined by the communication architecture.

BRIEF DESCRIPTION OF THE DRAWINGS

FIGS. 14A-C illustrate example data tables which may be generated by a server and provided to portable field maintenance tool to determine a level of authorization for a user;

DETAILED DESCRIPTION

Figure 1:
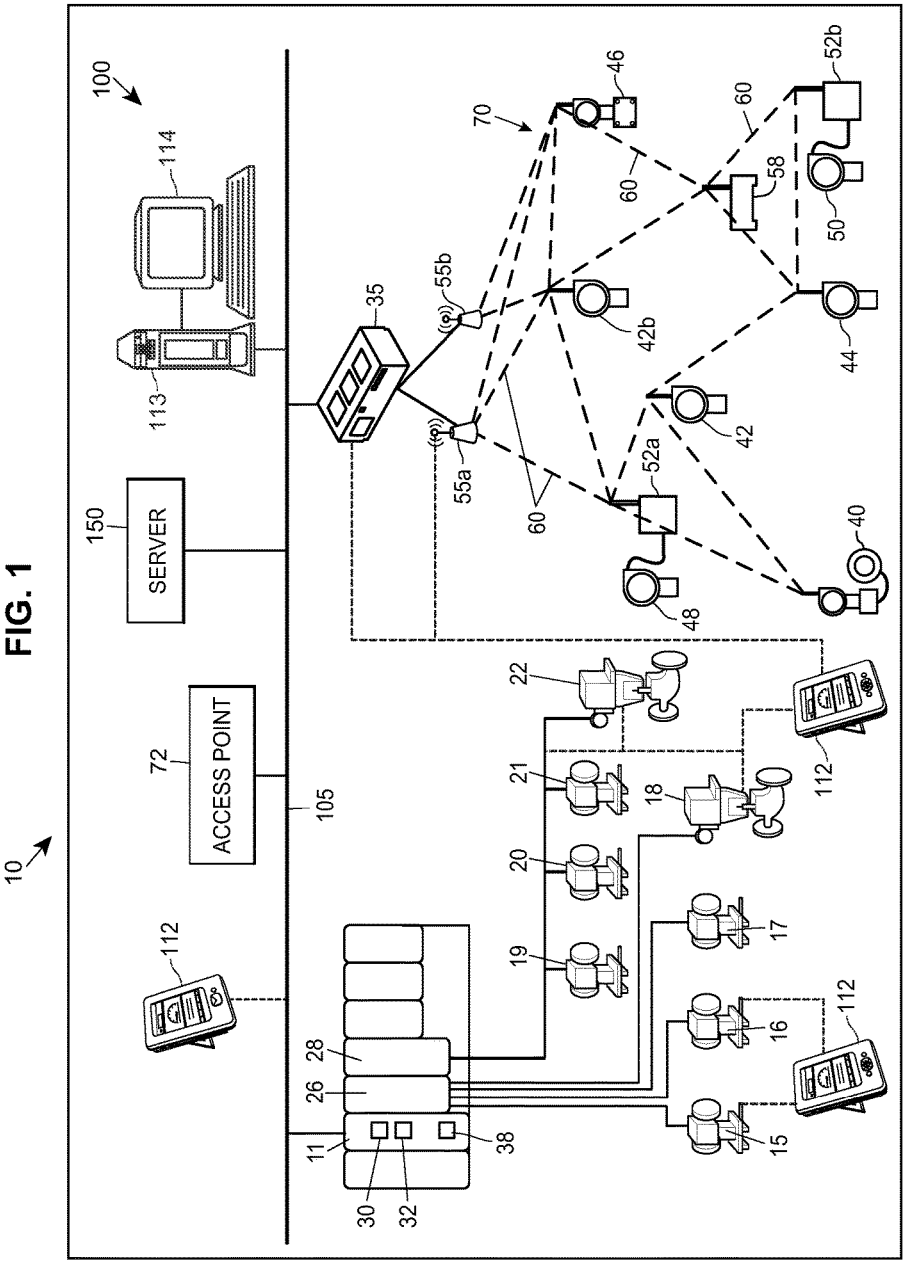
FIG. 1 is a block diagram of a distributed process control network located within a process plant or other industrial setting including industrial computing devices each having a platform using a communication architecture for platform-to-platform communications.

FIG. 1 is a block and schematic diagram of an exemplary process control network 100 operating in a process control system, process plant or other industrial setting 10. The process control network 100 may include a network backbone 105 providing connectivity directly or indirectly between a variety of other devices. The network backbone 105 may include both wireless and/or wired communication channels or links. The devices coupled to the network backbone 105 include, in various embodiments, combinations of access points 72, portable industrial computing devices 112 which may be handheld or other portable computing devices, such as a laptop computer, a tablet, a hand-held smart device, a portable testing device (PTD), etc., stationary industrial computing devices 113, such as a personal computer, workstation, etc. each having a display screen 114 as well as various other input/output devices (not shown), servers 150, etc.

As illustrated in FIG. 1, the controller 11 is connected to the field devices 15-22 via input/output (I/O) cards 26 and 28 which may implement any desired process control communication protocol, such as one or more of the HART, Fieldbus, CAN, Profibus, etc., protocols. The controller 11 is, in FIG. 1, communicatively connected to the field devices 15-22 to perform control of the field devices 15-22 and therefore control of the plant. Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 30 that implements or oversees one or more process control routines 38 (or any module, block, or sub-routine thereof) stored in a memory 32. Generally speaking, the controller 11 communicates with the devices 15-22 and the host computers 113 to control a process in any desired manner. Moreover, the controller 11 implements a control strategy or scheme using what are commonly referred to as function blocks (not shown), wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks exist and may be utilized. The function blocks may be stored in and executed by the controller 11 or other devices.

As illustrated in FIG. 1, wireless gateways 35, and wireless communication networks 70 are likewise communicatively coupled to the network backbone 105. The communication networks 70 may include wireless devices 40-58, which include wireless field devices 40-46, wireless adapters 52a and 52b, access points 55a and 55b, and a router 58. The wireless adapters 52a and 52b may be connected to non-wireless field devices 48 and 50, respectively. Though FIG. 1 depicts only a single one of some of the devices connected to the network backbone 105, it will be understood that each of the devices could have multiple instances on the network backbone 105 and, in fact, that the process plant 10 may include multiple network backbones 105.

The industrial computing devices 112, 113 may be communicatively connected to the controller 11 and the wireless gateway 35 via the network backbone 105. The controller 11 may be communicatively connected to wireless field devices 40-46 via the network backbone 105 and a wireless gateway 35. The controller 11 may operate to implement a batch process or a continuous process using at least some of the field devices 15-22 and 40-50. The controller 11, which may be, by way of example, the DeltaV™ controller sold by Emerson Process Management, is communicatively connected to the process control network backbone 105. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22 and the I/O cards 26, 28 are wired devices, and the field devices 40-46 are wireless field devices.

Moreover, the one or more portable industrial devices 112, which may be field device maintenance tools, multimeters, portable loop power supplies, field device configuration tools, etc., may be intermittently communicatively connected to one or more of the field devices 15-22, 40-50 and/or to one or more of the buses or communication lines to which the field devices 15-22, 40-50 are connected (e.g., a HART loop, a Fieldbus segment, etc.), with such connections being illustrated with dotted lines in FIG. 1. Such network connections may include the hardwired lines connecting one or more of the field devices 15-22, 40-50 to the I/O cards 26 and 28 via the backbone 105, for example. Alternatively, the portable industrial devices 112 may be communicatively connected directly to ones of the field devices 15-22, 40-50 (e.g., via communication terminals present on the field devices 15-22, 40-50). In some cases, the portable industrial devices 112 may provide power to the field device 15-22, 40-50 or to the wire loop to which it is connected. Moreover, the portable industrial devices 112 may enable a user to communicate with, configure, perform maintenance activities on, and/or diagnose one or more of the field devices 15-22, 40-50 when these field devices are installed in the plant. In still other cases, the portable industrial devices 112 may include wireless interfaces that may be used to connect wirelessly to one or more of the field devices 15-22, 40-50, such as a Bluetooth interface, a Wi-Fi interface, or a wireless process control protocol interface or connection, such as those that use the WirelessHART protocol. The portable industrial devices 112 described herein are generally described for configuring, supporting, and maintaining field devices and are thus shown as field device communicators which may be used to, for example, support process measurement devices, such as pressure, temperature, level, flow analytical sensor, flow meters, valve positioners, etc. However, the portable industrial devices 112 could be used to support, connect to, maintain, communicate with, or otherwise be used with other types of devices including, for example, rotating equipment, vibration detection and analysis equipment, power generating equipment, switches, motors, pumps, compressors, drives, mechanical vessels, such as tanks, pipes, etc., electrical power distribution devices, switch gear, motor control centers any other stand-alone equipment (e.g., equipment not communicatively connected to a process controller, for example), or any other types of industrial equipment. In these cases, the portable industrial devices 112 could have various different types of communication and electrical generation and detection hardware (e.g., voltage, current, impedance, etc. generation and detection equipment) to perform maintenance on, configuration of, and/or communication with these other types of industrial equipment.

In some embodiments, the portable industrial computing device 112 may be brought to the site of one of the field devices 15-22, 40-50 in the process plant. The portable industrial computing device 112 may be temporarily connected via a wired and/or a wireless connection to the field device 15-22, 40-50 for calibrating, configuring, troubleshooting, monitoring, controlling, or performing any other suitable operations on the field device 15-22, 40-50. Additionally, the portable industrial computing device 112 may be temporarily connected via a wired and/or wireless connection to the controller 11 for calibrating, configuring, troubleshooting, monitoring, controlling, or performing any other suitable operations on the controller 11.

In operation of the industrial computing devices 112, 113, the industrial computing devices 112, 113 may, in some embodiments, each execute a user interface (UI), allowing the industrial computing device 112, 113 to accept input via an input interface and provide output at a display. The industrial computing device 112, 113 may receive data (e.g., process related data such as process parameters, permissions, log data, sensor data, and/or any other data that may be captured and stored) from the server 150. In other embodiments, the UI may be executed, in whole or in part, at the server 150, where the server 150 may transmit display data to the industrial computing device 112, 113. The industrial computing device 112, 113 may receive user interface data (which may include display data and permission data) via the backbone 105 from other nodes or endpoints in the process control network 100, such as the controller 11, the wireless gateway 35, other industrial computing devices, or the server 150.

In some embodiments, permissions may be generated at the server 150 by a system administrator, for example, as part of a registration process for each industrial computing device 112. Each permission may specify a level of access to a particular process control device, such as read-only access, read/write access, access for calibration functions, access for configuration functions, etc. The system administrator may also assign permissions to users and industrial computing devices 112, 113 in the process plant. In some embodiments, the server 150 may be communicatively coupled to one or more databases which store indications of the permissions, authorized users within the process plant, industrial computing devices within the process plant, and associations between the permissions, users, and industrial computing devices. The permissions as well as indications of the corresponding users and industrial computing devices assigned to each permission may be transmitted to the industrial computing device 112, 113.

Accordingly, the industrial computing device 112, 113 may determine a level of authorization that the user has to a process control device connected to the industrial computing device 112, 113 using the permissions assigned to the user and/or the industrial computing device 112, 113 as part of registering the device 112, 113 with the process control network 100. As used herein, a level of authorization for a user may refer to a combined level of access that the user has to process control devices within the process plant. The combined level of access may be based on a set of permissions assigned to the user and/or the industrial computing device 112, where each permission specifies a level of access to a particular process control device. In some embodiments, a level of authorization for a user may also refer to a combined level of access that the user has to a particular process control device. The combined level of access may be based on each of the permissions assigned to the user and/or the industrial computing device 112, 113 which specify a level of access to the particular process control device.

Based on user data received at the industrial computing device 112, 113, the industrial computing device 112, 113 provides output (i.e., visual representations or graphics) indicating whether the user is authenticated and whether the user is authorized to access a particular process control device or function performed on the process control device. For example, the industrial computing device 112, 113 may provide an ID scan display requesting the user to scan an electronic ID card. The industrial computing device 112, 113 may also provide a user login display requesting the user to enter a username and password. The user may also affect control of the process by providing input at the industrial computing device 112, 113. For example, the portable industrial computing device 112 may provide indications of process parameters measured by a process control device which is connected to the portable industrial computing device 112. The user may interact with the portable industrial computing device 112 to calibrate the measurements taken by the process control device.

In certain embodiments, the industrial computing device 112, 113 may implement any type of client, such as a thin client, web client, or thick client. For example, the industrial computing device 112, 113 may depend on other nodes, computers, industrial computing devices, or servers for the bulk of the processing necessary for operation of the industrial computing device 112, 113, as might be the case if the industrial computing device is limited in memory, battery power, etc. (e.g., in a wearable device). In such an example, the industrial computing device 112, 113 may communicate with the server 150 or with another industrial computing device, where the server 150 or other industrial computing device may communicate with one or more other nodes (e.g., servers) on the process control network 100 and may determine the display data, permissions data, and/or process data to transmit to the industrial computing device 112, 113. Furthermore, the industrial computing device 112, 113 may pass any data related to received user input to the server 150 so that the server 150 may process the data related to user input and operate accordingly. In other words, the industrial computing device 112, 113 may do little more than render graphics and act as a portal to one or more nodes or servers that store the data and execute the routines necessary for operation of the industrial computing device 112, 113. A thin client industrial computing device offers the advantage of minimal hardware requirements for the industrial computing device 112, 113.

In other embodiments, the industrial computing device 112, 113 may be a web client. In such an embodiment, a user of the industrial computing device 112, 113 may interact with the process control system via a browser at the industrial computing device 112, 113. The browser enables the user to access data and resources at another node or server (such as the server 150) via the backbone 105. For example, the browser may receive data, such as display data, permissions data, or process parameter data from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the industrial computing device 112, 113 may take place at the industrial computing device 112, 113. For example, the industrial computing device 112, 113 may determine a level of authorization for the user. The industrial computing device 112, 113 may also store, access, and analyze data locally.

In operation, a user may interact with the industrial computing device 112, 113 to analyze, monitor, configure, troubleshoot, calibrate, or control one or more devices in the process control network 100, such as any of the field devices 15-22, 40-50 or the controller 11. The user may also interact with the portable industrial computing device 112, for example, to modify or change a parameter associated with a control routine stored in the controller 11. The processor 30 of the controller 11 implements or oversees one or more process control routines (stored in the memory 32), which may include control loops. The processor 30 may communicate with the field devices 15-22 and 40-50 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the industrial computing device 112, 113. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 11 may be configured (by a user using an industrial computing device 112, 113 in certain embodiments) to implement a control strategy or control routine in any desired manner.

Referring still to FIG. 1, the wireless field devices 40-46 communicate in a wireless network 70 using a wireless protocol, such as the Wireless HART protocol. In certain embodiments, the industrial computing device 112, 113 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10 (e.g., opening or closing valves or taking measurements of process parameters). The wireless field devices 40-46, however, are configured to communicate using the wireless communication protocol of the network 70, whereas the wired field device 15-22 are configured to communicate using a wired communication protocol (e.g., HART®, FOUNDATION® Fieldbus, etc.). As such, the wireless field devices 40-46, the wireless gateway, and other wireless nodes 52-58 of the wireless network 70 are producers and consumers of wireless communication packets, whereas the wired field devices 15-22 are producers and consumers of wired communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor 52a or 52b. Additionally, the wireless adaptors 52a, 52b may support other communication protocols such as FOUNDATION® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices (e.g., portable industrial computing devices 112) to communicate over a respective wireless network that is different from the wireless network 70 and that supports a different wireless protocol than the wireless network 70. For example, a portable industrial computing device 112 may be a mobile workstation or diagnostic test equipment that is utilized by a user within the process plant. In some embodiments, the industrial computing device 112, 113 communicates over the process control network 100 using a wireless access point 72. In some scenarios, in addition to portable computing devices, one or more process control devices (e.g., controller 11, wired field devices 15-22, or wireless devices 35, 40-58) may also communicate using the wireless network supported by the access points 72.

Although FIG. 1 illustrates a single controller 11 with a finite number of field devices 15-22, 40-50, this is only an illustrative and a non-limiting embodiment. Any number of controllers 11 may be included in the provider devices of the process control network 100, and any of the controllers 11 may communicate with any number of wired or wireless field devices 15-22, 40-50 to control a process in the plant 10. Furthermore, the process plant 10 may also include any number of wireless gateways 35, routers 58, access points 55, 72, portable industrial computing devices 112, stationary industrial computing devices 113, and/or wireless process control communication networks 70.

In some embodiments the server 150 may act as an enrollment server for registering and enrolling industrial computing devices 112, 113 in a process control messaging service. That is, where the process control network 100 may permit communication between various industrial computing devices 112, 113, servers 150, etc., a process control messaging network may be logically separate from the process control network 100 to permit intercommunication among and between industrial computing devices 112, 113 using a process control messaging service. The process control messaging service is a grouping of infrastructural services and capabilities deployed in a distributed manner on the physical process control network 100, but logically separate from the digital process control communication channel or link used for communications between the controller 11 and the field devices 15-52. The process control messaging service provides secure, reliable, fast/responsive communications, message delivery, data transfer and other operations between IT systems, personal computer and industrial devices 112, 113. In doing so, the process control messaging service enables a number of other networked capabilities including, but not limited to, communication between an industrial computing device 112, 113 and a field device 15-50 via an asset management system, data synchronization between an industrial computing device 112, 113 and an asset management system, field device access control from an industrial computing device 112, 113, and fleet management of industrial computing devices 112, 113, particularly portable industrial computing devices 112. The process control messaging service does not replace other IT network and security systems and services, but extends those IT capabilities and provides another layer of security/authorization, services and capabilities that are applicable to the types of application capabilities needed in a process control system.

Figure 2:
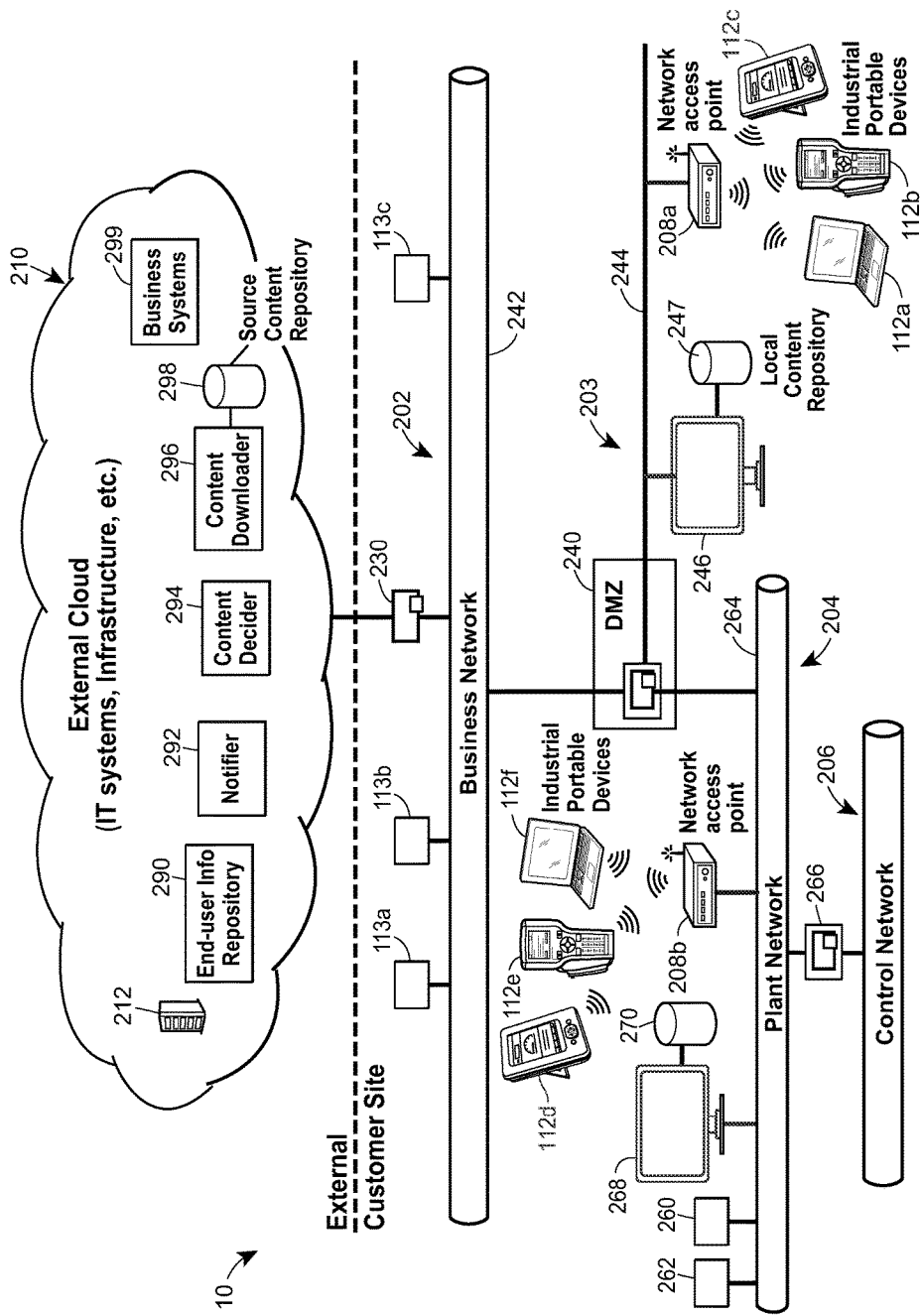
FIG. 2 is a block diagram of an exemplary process control messaging network operating in a process control system, process plant or other industrial setting.

FIG. 2 is a block diagram of an exemplary process control messaging network 200 operating in a process control system or process plant 10 (or other industrial setting or environment). In particular, the process control messaging network 200 may include a variety of portable industrial computing devices 112a-112e, such as laptop computers, tablets and hand-held field communicators, and a variety of stationary industrial devices 113a-113c, such as personal computers and workstations. The various industrial computing devices 112a-112e, 113a-113c may be connected directly or indirectly via one or more network backbones 202, 204, 206. Each backbone 202-206 may correspond to different network levels within the process control system. For example, the plant network and communication system 10 additionally includes a set of interconnected communication networks at the plant site (or at multiple plant sites or locations). In particular, the plant networks illustrated in FIG. 2 include a top level or business network 202, a plant administrative network 203, and a plant device network 204 which is connected to one or more control networks 206 (only one of which is illustrated in FIG. 2). As will be understood, the plant network 204 and the control network 206 may be the network 105 and sub-networks connected thereto for supporting the field devices 15-50 illustrated in FIG. 1. The process control messaging network 200 includes or is connected o an external server network 210 which may be located at an external (to the plant or other industrial setting) site, such as in the cloud.

As illustrated in FIG. 2, the business network 202 includes a set of business computers, workstations or other business stationary industrial computing devices 113a-113c which may implement business, accounting, planning, etc. applications, and this network 202 is connected to the external server system or network 210 via a firewall device 230. Likewise, the business network 202 is connected to the administrative network 203 and to the plant network 204 via a DMZ device or system 240 which acts as a network-to-network intermediary. Generally speaking the business network 202 includes several workstations 113a-113c connected to a communication link 242 consistent with any suitable communication standard such as the IEEE 802.3 Ethernet standard, for example. As is typical, the workstations 113a-113c share an operating system having networking capabilities such as, for example, Windows™ manufactured by the Microsoft Corporation. Users in various organizational roles operate the workstations 113a-113c to carry out day-to-day activities within the plant, such as that of a plant operator, business systems that manage the plant, etc. For example, the plant operator may employ engineers, accountants, marketing staff, and other personnel. Users who operate the workstations 113a-113c may have a certain set of permissions that typically do not permit these users to access the process plant network 204 or the process control network 206. On the other hand, these users have a mostly unrestricted access to hosts on the Internet and, as a result, a relatively high risk of exposure to viruses, malware, hijacking attempts, and other cyber threats.

Likewise, the administrative network 203 includes various computers or workstations connected via a communication link 244 consistent with any suitable communication standard such as the IEEE 802.3 Ethernet standard, for example. One or more of the personal computers, workstations, or other stationary industrial computing devices illustrated as a workstation 246 in FIG. 2, may operate as a fleet management station which includes or is connected to a local content repository 247 which stores local content for various of the portable industrial computing devices in the plant. Likewise, the administrative network 203 may include one or more process control messaging network access points 208a which may be wireless access points that enable one or more portable industrial computing devices 112a-112c (each having a wireless interface) to connect to the network 203 in a wireless manner, and thus to connect to the workstation 246 for large file transfers, messaging, etc., as will be described in more detail herein.

In a similar manner, the plant network 204, which may be the network 100 of FIG. 1, includes various computers or workstations 260, data historians 262, etc. which are examples of stationary assets or devices connected via a communication link 264 consistent with any suitable communication standard such as the IEEE 802.3 Ethernet protocol, for example. The network 204 is connected via an access point 266, which may be a firewall or a control device, for example, to the process control network 206. Generally speaking, the workstations 260 may be operator workstations that enable process or control operators to view and control ongoing operations of the devices in the process control network 206 (such as controllers, field devices, etc.) to perform plant or on-line control operations. These workstations 260 may include and execute various different applications that enable personnel such as operators and maintenance personnel to perform various analyses on control assets, such as field devices, and on other types of assets, such as rotating equipment, vibration equipment, power generation equipment, etc. As illustrated in FIG. 2, one or more of the stationary industrial computing devices, illustrated as a workstation 268, may operate as a fleet management station which includes or is connected to a local content repository 270 that stores local content for various ones of portable industrial computing devices 112d-112f in the plant. If desired, the workstation 268 may operate to manage and the local content repository 270 may store local content for various ones of the stationary industrial computing devices as well or instead. Likewise, the plant network 204 may include one or more process control messaging network access points 208b which may be wireless access points that enable one or more of the portable industrial computing devices 112d-112f (each having a wireless communication interface) to connect to the network 204 and thus to the workstation 268 for large file transfers, messaging, etc., as will be described in more detail herein. The portable industrial computing devices 112a-112f may include multiple devices of the same type (e.g., field communicators, oscilloscopes, ammeters, etc.) and may include devices of different types as well as devices made by different manufacturers or devices having different capabilities.

As will be understood, the control network 206 may include various control devices and sub-networks, such as controllers, input/output (I/O) devices, and field devices connected via proprietary or process control networks such as HART, FOUNDATION Fieldbus, Profibus, CAN, etc. networks, and these sub-networks may use any desired process control protocol. Generally speaking, the portable industrial computing devices 112a-112f may be used to perform maintenance, checkout, repair, testing, calibration, and configuration activities on these devices and sub-networks. Likewise, the plant or other industrial setting may include other types of devices, such as vibration analysis and monitoring devices, rotating equipment, power generation equipment, etc. disposed therein that is not illustrated in FIG. 2 but that may be serviced, maintained, installed, repaired, tested, calibrated, etc. using one or more portable industrial computing devices 112a-112f.

In addition, combinations of process control messaging access points 208a-208c may be distributed on each network 202-206 for connectivity directly or indirectly between industrial computing devices 112a-112e, 113a-113c, 246, 268 to access (i.e., register and/or enroll in) the process control messaging network 200, and, in turn, access process control messaging services. Generally speaking, these access points 208a-208c are at least logically separate from the access points 55a, 55b and the wireless gateway 35, and in some embodiments are both logically separate and physically separate from the access points 55a, 55b and the wireless gateway 35. In other words, in some embodiments the access points 208a-208c may utilize the same hardware as the access points 55a, 55b and the wireless gateway 35, though in other embodiments the access points 208a-208c have their own hardware separate from the access points 55a, 55b and/or the wireless gateway 35. As with FIG. 1, although FIG. 2 depicts only single ones of some of the devices connected to the network backbones 202-206, it will be understood that each of the devices could have multiple instances on the network backbones 202-206 and, in fact, that the process plant 10 may include multiple network backbones 202-206 for each network level.

The DMZ layer or device 240 operates to separate the process control layers or networks 204 and 206 as well as the plant or industrial setting device networks, and the administrative network 203 from the internet or other external networks or public networks, such as the business LAN network 202 and the external network 210. In the example communication system 10 of FIG. 2, the plant LAN layer or business network 202 is connected to the internet or other public network via a router/firewall 230, and the plant DMZ layer 240 is connected to the plant LAN layer or business network 200 via a router/firewall as part of the DMZ 240.

The plant DMZ 240 may include several servers such as an anti-virus server, a data server, and a historian server. As is known, a DMZ layer 240 generally provides additional security to a local or plant networks, such as the networks 203, 204, and 206, by limiting direct exposure to a larger network such as the internet to only several hosts (i.e., the anti-virus server, data server and historian server, a DNS server, a web server, etc.). It will be noted that the DMZ layer or device 240 in general may be any intermediate network layer that improves the security of the systems 203, 204, and 206 by directing all incoming and outgoing internet traffic via one or several hosts that implement security features to make the communications secured. In addition to the process control messaging network 200 within the process control system or process plant 10, the process control messaging network 200 may be communicatively coupled to a computing cloud or other system external 210 to the process control system 10, where the external system 210 includes its own IT systems, infrastructure, etc. including its own servers 212. In some embodiments, the external system 210 may provide storage, analysis and/or updating services as a third part to the process control system 10. For example, the external system 210 may maintain information on the configuration of the process control system 10, including uploading information on the configuration, diagnostics, etc. of specific field devices 15-52 from individual ones of the industrial computing devices 112a-112e, 113a-113c, 246, 268 content downloads to the industrial computing devices 112a-112e, 113a-113c 246, 268 en masse or to individual ones of the industrial computing devices, license management, etc.

Moreover, the external system 210 of FIG. 2 includes various systems and components, such as, for example, an end-user repository 290, a notifier 292, a content decider 294, and a content downloader 296 which may generally operate together to determine the content that needs to be downloaded to various ones of the industrial computing devices 112a-112e, 113a-113c, 246, 268. The system 210 may also include one or more business systems or computers 299. The business systems 299 may be used to purchase or acquire new content for one or more of the portable devices 112a-112e, 113a-113c, 246, 248, and may provide indications of such a purchase or license in the form of license keys, codes, etc. Likewise, the various firewall and DMZ devices 230 and 240 include programming or configurations that enable secure communications between the industrial computing devices and the components in the external network 210. For example, the workstations 246 and 268 include communications software that enable these devices to navigate the DMZ and firewall devices 230 and 240 to communicate through these devices in a secured manner to the external network 210.

More specifically, the portable industrial computing devices 112a-112e may include field communicators, calibrators, and other types of portable devices, that are used in industrial settings such as industrial plants, process plants, oil wells, pumping stations, etc., to configure, troubleshoot, calibrate, and perform other operations on field devices such as process measurement devices, valves, positioners, etc. as well as other types of devices or assets used in industrial settings, such as rotating equipment (turbines for example), power generation equipment, vibration analysis and detection equipment, etc. Of course, different types and brands of industrial portable devices may be manufactured by the same or different manufacturers, and various ones of the portable industrial computing devices 112a-112e may have different features and capabilities. For example, some of the portable industrial computing devices 112a-112e may be field communicators that communicate on one or more of the various sub-networks 206 in the plant to communicate with field devices such as HART or Fieldbus field devices. Some of the portable industrial computing devices 112a-112e may be calibrators or configurators that calibrate or configure devices in the plant, including field devices and other types of devices, such as rotating equipment, vibration analyzers, etc. Still further, some of the portable industrial computing devices 112a-112e may be or may include electrical testing functionality, such as ammeters, voltmeters, resistance meters, impedance meters, or multi-meters used to test wiring and other devices in the plant, such as power supplies. Likewise, some of the portable industrial computing devices 112a-112e may be intrinsically safe and thus able to be used in hazardous environments. Some of the portable industrial computing devices 112a-112e may be specially configured portable devices made by various manufacturers, or may be implemented as software features or hardware implemented on or connected to a general purpose computer, such as a laptop, a phone, a personal digital assistant (PDA), a tablet computer, etc. The portable industrial computing devices 112a-112e may be grouped into one or more fleets of portable devices in any manner using, for example, one of the workstations 246, 268 as fleet management stations, based on, for example, functionality, use, type, manufacturer, users, etc., or any combination of these and other characteristics. In order to provide additional security above and beyond standard IT security mechanisms (e.g., user authentication, Active Directory, etc.), the process control messaging network 200 maintains network isolation between external networks, such as the external cloud 210, and internal communication networks at the end user's site (e.g., the plant) typically include multiple, isolated networks, including business networks 202, plant networks 204, control networks 206, etc., and a network-to-network intermediary or DMZ device 240 executes software that runs on top of the existing routers in the plant to interconnect these networks. In one example, the DMZ software implements port re-direction which retains network isolation, but allows the computers or industrial devices on a plant network to gain secure access to other networks including the external cloud network 210. Thus, while process control messaging network 200 may include much of the same or similar hardware as the process control network 100, the process control messaging network 200 remains logically separate from the process control network 100. At the same time, the process control messaging access points 208a-208c distributed among the multiple, isolation networks and the process control messaging service permit communication across multiple, isolated networks. As used herein, the networks 202, 203, 204, 206 and the devices connected thereto may be considered to be all at the same general location referred to as a first or a second location, or these networks and devices may be considered to be at different locations.

Additionally, the feet management stations 246 and 268 are computers or workstations having processors that execute associated fleet management software that are, in this example, located at the end user's site or in the plant. These devices are used as the user interface by a plant or fleet administrator, for example, to manage each of the identified fleets of portable industrial computing devices in the plant. More particularly, these computers are used by the portable (or stationary) device fleet administrator to perform some or all activities in conjunction with automatically and semi-automatically managing the content within the fleets of industrial portable devices 112a-112f as well as fleets of stationary devices if so desired. Likewise, the local content repositories 247 and 270 are databases that locally store content for the portable industrial computing devices 112a-112f (as well as for stationary devices if desired) at the end-user's site prior to or after that content has been downloaded to the various portable industrial computing devices 112a-112f or stationary devices 113a-113c.

However, in at least one embodiment such as that illustrated in FIG. 2, the external cloud or server system (IT systems, infrastructure, etc.) that is external to the plant networks includes the content decider 294 which is a software mechanism that generally runs on IT infrastructure (servers, processors, etc.) in the external cloud to evaluate a number of different input criteria, and to determine what filtered/targeted content a particular industrial portable device (or content that a particular stationary device) at a particular customer site is entitled to have or use. Generally speaking, the content decider 294 stores or receives inputs detailing the features, programming, operating systems, upgrades, etc. (all of which is referred to as content), and configuration information indicating configuration parameters for the industrial portable devices 112a-112f or stationary devices, and determines what content each industrial device in the fleet of industrial portable devices or stationary devices is allowed to have. Moreover, the content downloader 296 is coupled to the content decider 294 and provides efficient, secure connections for downloading content to the industrial devices, as specified by the content decider 294, via the external and internal networks of the plant in which the industrial portable device or stationary device is used or located.

Still further, the source content repository 298 stores all content available for download to the industrial portable devices 112a-112f (or stationary devices if so desired) and provides that content to the content downloader 296 when needed to be downloaded to the industrial portable devices 112a-112f (or stationary devices) in the plant. The notifier 292 is a module (e.g., software executed on a processor) that sends notifications to users when content becomes available for or is determined to be downloadable to particular industrial devices, such as when the content decider 294 determines that new content has been obtained (e.g., licensed or purchased) using one of the business systems computers 299. Generally speaking, the business systems computers 299 include user account and authentication, purchasing, order management systems, an application or feature store, etc., that may be used to acquire new content. Finally, the end user information repository 290 is a database and communication module that gathers and stores end-user information regarding or detailing the current list of content and versions of such content on each industrial portable device in the fleet of industrial portable devices 112a-112f and/or on each a set of stationary devices in a fleet of stationary devices in a plant or other industrial setting.

Figure 3:
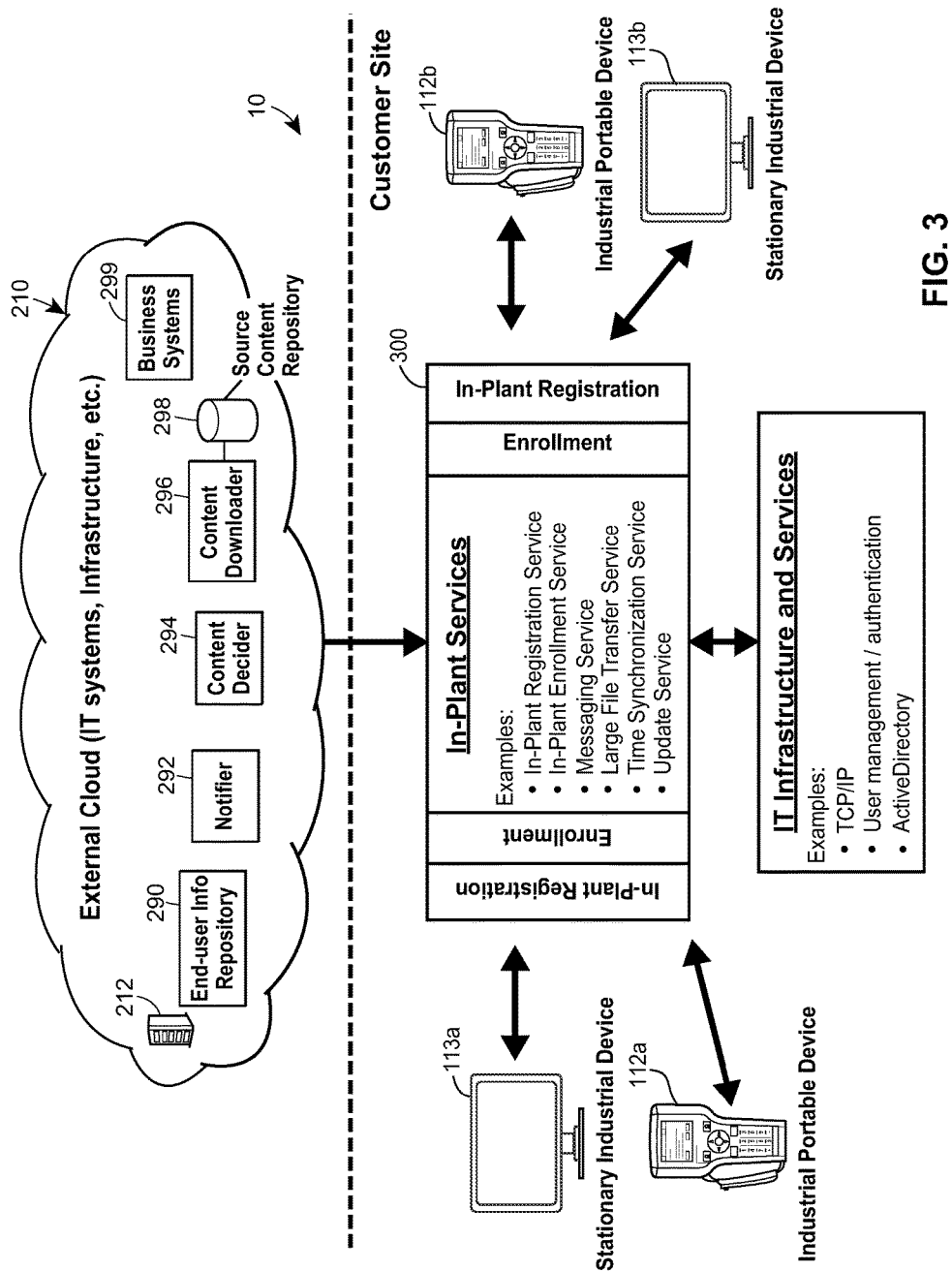
FIG. 3 is a block diagram of an example interaction between industrial computing devices using a process control messaging system architecture.

FIG. 3 illustrates a block diagram of an example interaction between a requesting endpoint (RequestEndpoint) and a responding endpoint (ResponseEndpoint), such as between industrial computing devices 112, 113 using a process control messaging system architecture 300. In one example, the firewalls 230 and/or the DMZ 240 act as endpoints, and, more particularly, intermediary endpoints, for redirecting messages from a requesting endpoint to a responding endpoint across networks. As mentioned, the DMZ software implements port re-direction which retains network isolation, but allows industrial computing devices to gain secure access to other networks and communicate with other industrial computing devices or with external networks. As such, a requesting endpoint may specify the firewall or DMZ as an endpoint, with information in the request specifying the responding endpoint in the other network. The firewall or DMZ may receive the message, and, using security software, analyze and/or scrub the message for redirection to the responding endpoint using port redirection.

Each endpoint includes a platform and an application. The interaction can be broken down into registration, enrollment and participation in the process control messaging service. It should be understood from the following that the process control messaging system architecture 300 is platform independent, such that it enables communication between a variety of platforms, including, but not limited to, other industrial device computing platforms (e.g., operating systems and interfaces such as Windows XP, Windows Embedded Compact 2013, Windows 10, etc.), and field device communication platforms (e.g., Fieldbus, HART, etc.).

Further, the process control messaging system architecture 300 enables specifying transport types/protocol independence at the physical layer (e.g., WiFi, Universal Serial Bus (USB), etc.) for a particular application based on best protocol fit. For example, a portable industrial computing device 112a using the process control messaging system architecture 300 may specify a WiFi transport type when connecting to the process control messaging service via a wireless access point 208a, whereas the portable industrial computing device 112a may specify a USB transport type when connecting to the process control messaging service via a USB connection to a personal computer 112b.

In particular, the process control messaging system architecture 300 includes components and services, which are deployed on individual industrial computing devices 112, 113, and centralized computers, such as the server 150. The components and services of the process control messaging system architecture 300 are represented as a layer of abstraction having a dedicated communication protocol above standard IT infrastructure and services (e.g., TCP/IP, authentication, Active Directory), and particularly above the transport layer of the process control network. Thus, where the transport layer has a network communication protocol corresponding to the process control network (e.g., TCP/IP), the communication protocol of the process control messaging service is layered above the network communication protocol.

The process control messaging system architecture 300 further includes a process control communication protocol (e.g., Fieldbus, HART, etc.) layered above the communication protocol of the process control messaging service. As such, a requesting industrial computing device may specify the communication protocol of the destination device, be it another industrial computing device, a field device, etc.

Generally speaking, the process control messaging system architecture 300 facilitates request-response and large data transfer operations between machine platforms connected via wireless or wired connection within the plant infrastructure. The process control messaging system architecture 300 is designed to support various activities for services within the plant or other industrial setting such as exchanging information between services within the external network or cloud 210 (e.g., licensing and updating services for industrial computing devices, web services (e.g., web extender client), etc.) and platforms connected to the process control messaging network 200 (e.g., internal plant services, which essentially comprises enrolled platforms that provide services in the multi-platform environment). Each platform may include multiple instances of the process control messaging architecture installed and running on the system of the platform (e.g., industrial computing devices). On the other hand, a simple implementation would have one computing device (e.g., a stationary industrial computing device) with a single instance of the process control messaging architecture installed, thereby having the one computing device facilitating as a connection point to services within the plant 10 or the external network 210.

In a request-response type of operation, the process control messaging system architecture supports the sending of a request to a platform endpoint, and an application-topic responding by sending the response to a specified endpoint in the request. Request and response activities involve sending and receiving data to and from endpoints referred to as "RequestEndPoint" and "ResponseEndPoint". The RequestEndPoint is the destination to which the request is delivered and the source/origin of the response, and ResponseEndPoint is the destination to which the response is delivered and the source/origin of the request. The RequestEndPoint and ResponseEndPoint include a Platform and Application. The request-response endpoint is made up of a topic, an application and a platform. In short, the request/response operation involves a client sending a request (Topic) to an application running on a platform, and having a response returned. The topics are hosted in an application running on a platform. The topic identifies the topic for which the application should perform, with the topic name being unique across all topics within the application namespace. The application is the container which received topics and routes the topics for processing. The platform has a process which hosts the application. Therefore, in order to reach a specific topic, the request-response message specifies the application, platform and topic identifiers.

In a large data transfer (LDT) operation, the process control messaging architecture supports the transferring of files from a source location to a destination, referred to as "LDTSource" and "LDTDestination", respectively. The LTD endpoint includes a PlatformID, which specifies the source platform and the destination platform. The LDT source and destination includes a Uniform Resource Locator (URL). The LDTSource specifies a specific resource, whereas the LDTDestination need only specify location.

In either the request/response type of operation (e.g., instant/real-time messaging, time synchronization) or the LDT operation, the request may specify quality of service in the communication between endpoints. For example, the request may specify guaranteed delivery, whereby a copy of the message is temporarily persisted in a database or other origination client storage while ascertaining the ability of the endpoint client to receive the message by acknowledging receipt, at which point the copy of the message is erased from the database. On the other hand, the request may not specify guaranteed delivery (or specify no guaranteed deliver), and send the request without persisting the message and without ascertaining the endpoint's ability to receive the message. While any operation may utilize guaranteed or unguaranteed delivery, generally speaking, large data transfer utilize guaranteed delivery due to the size of the transfer of data, whereas a request/response service, such as realtime or instant messaging, may be more concerned with the timeliness of the delivery and abstain from using guaranteed delivery.

Figure 4:
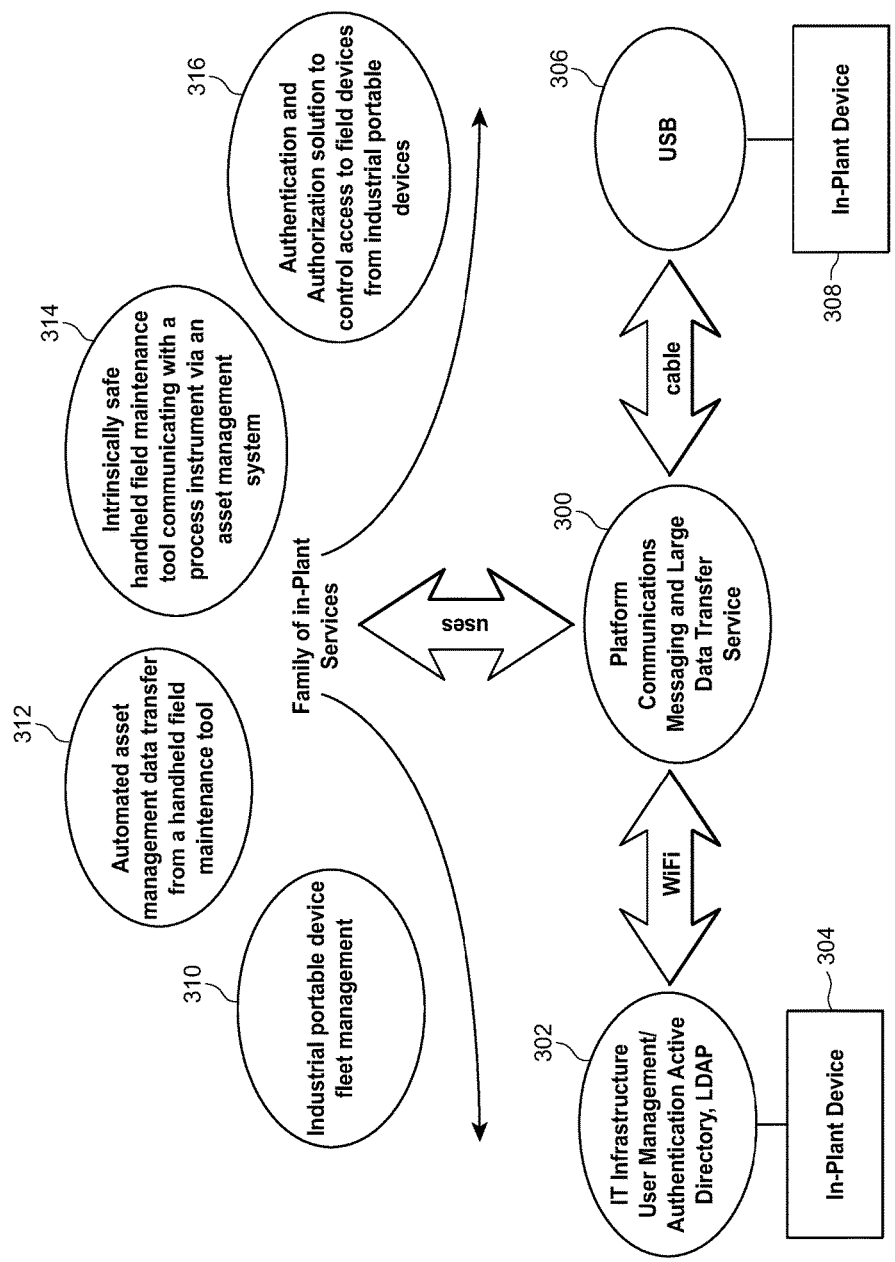
FIG. 4 is a schematic relationship between the process control messaging architecture, access points, participating devices and process control messaging services.

FIG. 4 depicts a schematic relationship between the process control messaging architecture 300, access points 302, 306, participating devices or endpoints 304, 308 and process control messaging services 310-316. Using the process control messaging system architecture 300 distributed throughout devices in the process control messaging network, a variety of process control messaging services 310-316 may be provided between and among field devices 304, industrial computing devices, external clouds, personal computers 308, etc., including, but not limited to, secure communications, instant/real-time messaging, file transfer, data synchronization, time synchronization, industrial computing device platform updates. However, in order for any device, and particularly portable industrial computing devices 112, to participate in the process control messaging services and utilize services that enable communications, messaging, data transfer and other interactions with other industrial computing devices in the process control messaging network, industrial computing devices must be registered and enrolled with the process control messaging service.

Figure 5A:
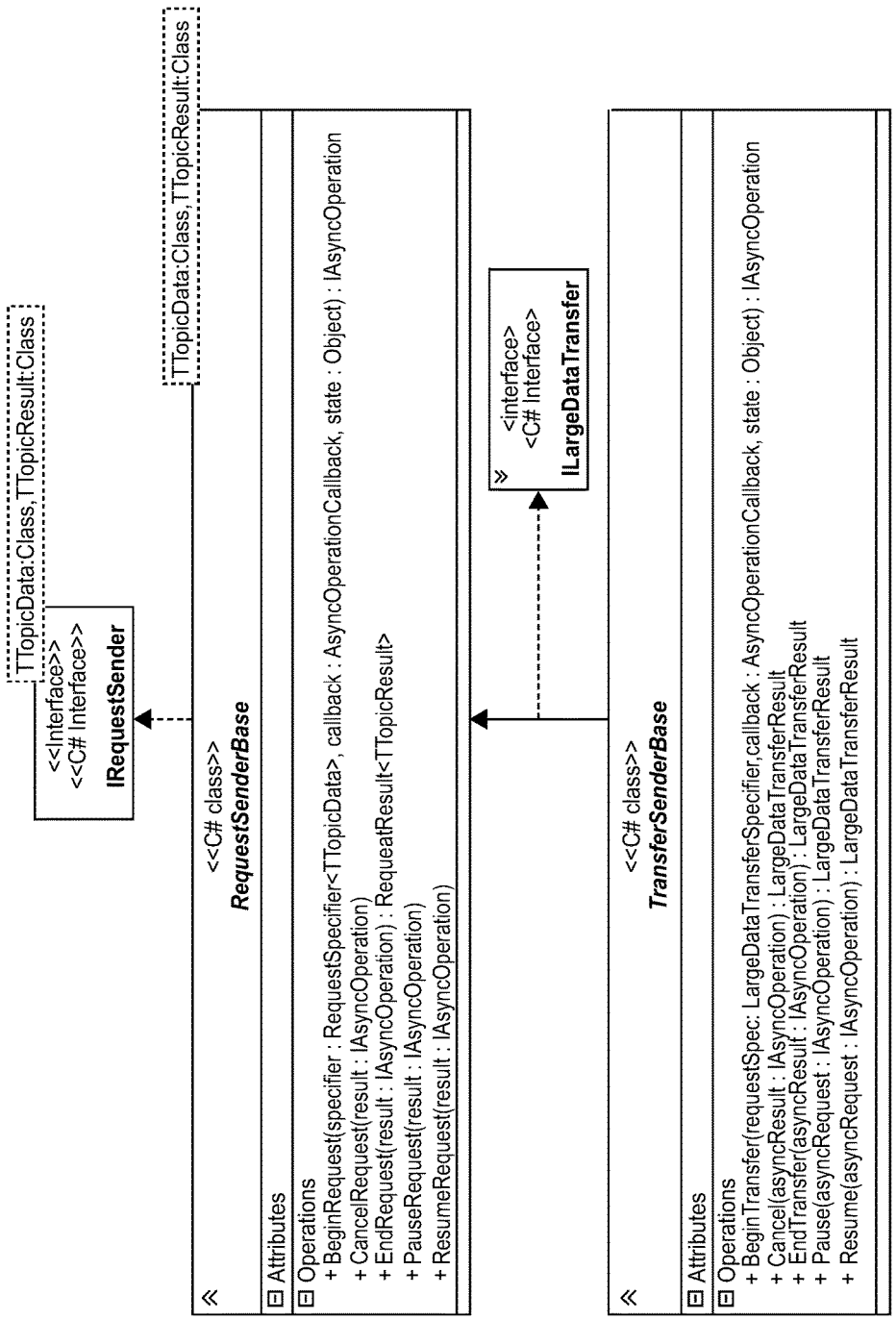
FIGS. 5A and 5B are depictions of primary public interfaces and base classes defined in a process control messaging system architecture.
Figure 5B:
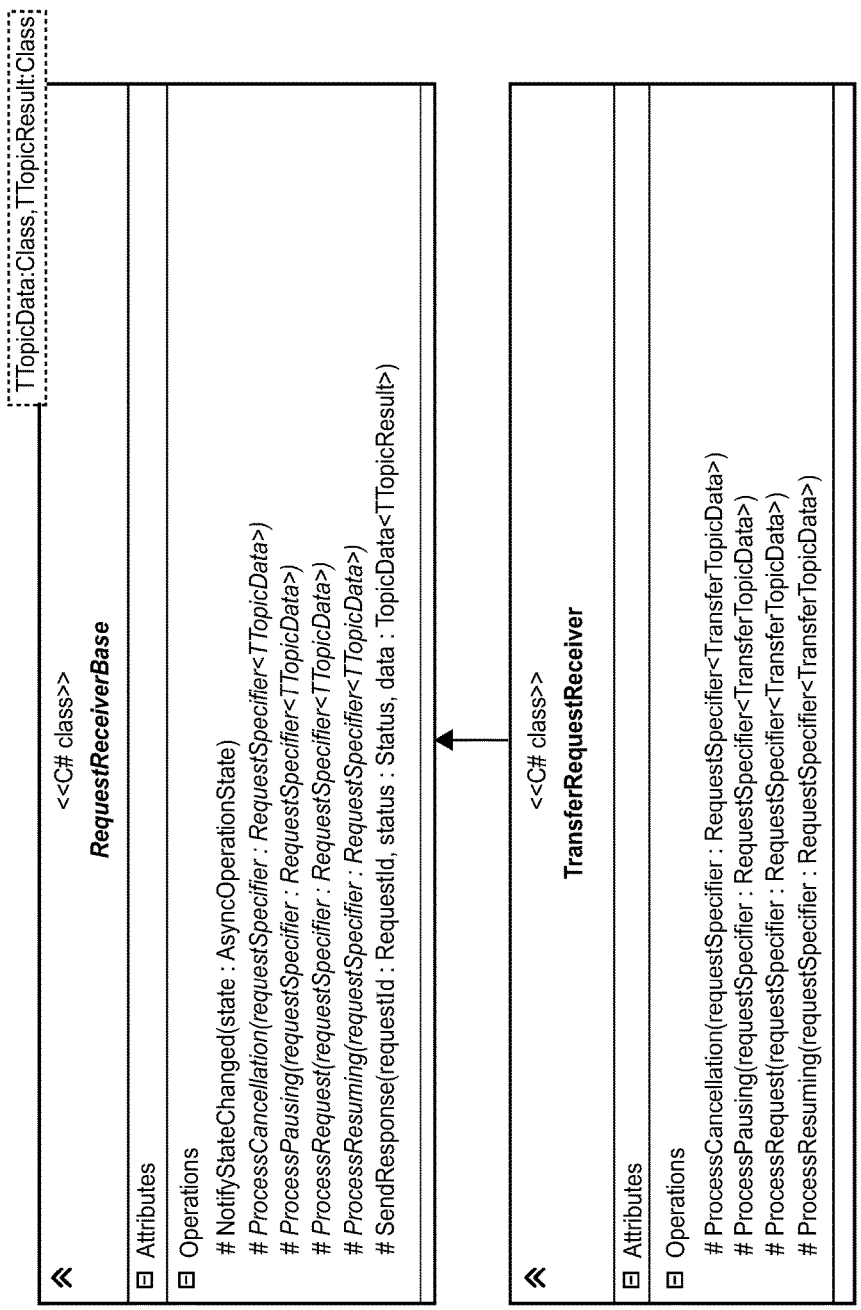

Public interface definitions for the process control messaging system architecture 300 are used by applications or services to perform various activities. FIGS. 5A and 5B depict examples of primary public interfaces and base classes defined in the process control messaging system architecture 300. As shown in FIG. 5A, an example interface (IRequestSender) facilitates requests based on an Application-Topic from one platform to another, using a number or class of defined methods (RequestSenderBase). The RequestSenderBase is an abstract class implementing the IRequestSender interface that is defined in the process control messaging system architecture 300 level, and is aware of the infrastructure (e.g., messaging) of the process control messaging system architecture 300. Each request sender inherits from the base class.

In the present example, the defined methods include, but are not limited to, BeginRequest, EndRequest, PauseRequest, ResumeRequest and CancelRequest. The BeginRequest is an asynchronous method called by the requesting client (ResponseEndpoint) to start a request based on an Application-Topic to be delivered to a RequestEndpoint. The BeginRequest method utilizes an operation request specifier that contains the details of the request, an asynchronous callback to be called when the operation is complete, and a user-provided object that distinguishes each particular asynchronous operation request from other requests. The BeginRequest method returns an IAsyncOperation that represents the asynchronous operation, which, at the time, could still be pending.

The EndRequest method is a method the requesting client calls upon completion of the request to read the completion result. The EndRequest method otherwise waits for the pending asynchronous operation to complete, and utilizes the reference to the pending asynchronous request to finish which is returned by the BeginRequest method when the asynchronous operation is started, IAsyncOperation. The EndRequest method further returns the result of the asynchronous operation. The PauseRequest method is a method the requesting client calls to pause a specified asynchronous operation. The PauseRequest method utilizes the reference to the pending asynchronous request to pause as returned by the BeginRequest method when the asynchronous operation is started, IAsyncOperation. The ResumeRequest method is a method the client endpoint calls to resume a paused specified asynchronous operation. The ResumeRequest method likewise utilizes the reference to the pending asynchronous request to resume as returned by the BeginRequest method when the asynchronous operation is started, IAsyncOperation. The Cancel Request method is a method the requesting client calls to cancel a specified asynchronous operation, and utilizes the reference to the pending asynchronous request to cancel which was returned by the BeginRequest method when the asynchronous operation is started, IAsyncOperation.

As shown in FIG. 5B, an example interface (RequestReceiver) processes responses based on an Application-Topic from one platform to another, using a number or class of defined methods (RequestReceiverBase). The RequestReceiverBase is an abstract class defining or implementing the RequestReceiver interface method and is defined in the process control messaging system architecture 300 level, and is aware of the infrastructure (e.g., messaging) of the process control messaging system architecture 300. Each request receiver inherits from the base class, and implements the abstract methods.

In the present example, the defined methods include, but are not limited to, ProcessRequest, ProcessPausing, ProcessResuming, ProcessCancellation, SendResponse and NotifyStateChanged. The ProcessRequest is an abstract method (i.e., a method that is declared but contains no implementation—may not be instantiated—and requires a subclass to provide implementations) called by the receiving client (RequestEndpoint) to process an incoming request based on an Application-Topic. The ProcessRequest method utilizes the operation request specifier from the IRequestSender.BeginRequest method, IAsyncOperation, and calls upon the SendResponse method once the operation is complete. The ProcessPausing method is an abstract method called by the receiving client to process an incoming pausing request for the operation from the IRequestSender.PauseRequest method. The ProcessPausing method utilizes the operation request specifier from the IRequestSender.BeginRequest method, IAsyncOperation, to specify the operation to pause. The ProcessResuming method is an abstract method called by the receiving client to process an incoming resume request for the operation from the IRequestSender.ResumeRequest method. The ProcessResuming method utilizes the operation request specifier from the IRequestSender.BeginRequest method, IAsyncOperation, to specify the operation to resume. The ProcessCancellation method is an abstract method called by the receiving endpoint to process an incoming cancellation request for the operation from the IRequestSender.CancelRequest method. The ProcessCancellation method utilizes the operation request specifier from the IRequestSender.BeginRequest method, IAsynchOperation, to specify the operation to cancel. The ProcessCancellation method may call upon the SendResponse method when the operation is cancelled. The SendResponse method is an abstract method called by the receiving client to send the response to the ResponseEndpoint specified in the request specifier from the IRequestSender.BeginRequest method, IAsynchOperation. The SendResponse method utilizes the request specifier identification, the operation status and the operation result as part of the response. The NotifyStateChanged method is an abstract method called by the receiving client to send a change of state notification to the ResponseEndpoint specified in the request specifier from the IRequestSender.BeginRequest method, IAsynchOperation.

Referring again to FIG. 5A, the example interface (ILargeDataTransfer) facilitates large data transfers from one platform to another using a number or class of defined methods (TransferRequestSender). The TransferRequestSender implements the interface ILargeDataTransfer and is defined in the process control messaging system architecture 300 level. The interface ILargeDataTransfer allows instantiation of the large data transfer operation.

In the present example, the defined methods include, but are not limited to, BeginTransfer, EndTransfer, Pause, Resume and Cancel. The BeginTransfer is an asynchronous method called by the requesting client (ResponseEndpoint) to start a large data transfer operation. The BeginTransfer method utilizes an operation transfer specifier that contains the details of the large data transfer operation, an asynchronous callback to be called when the large data transfer operation is complete, and a user-provided object that distinguishes each particular asynchronous large data transfer operation request from other large data transfer requests. The BeginTransfer method returns an IAsyncResult that represents the large data transfer asynchronous operation, which, at the time, could still be pending.

The EndTransfer method is a method the requesting client calls upon completion of the large data transfer to read the completion result. The EndTransfer method otherwise waits for the pending asynchronous large data transfer operation to complete, and utilizes the reference to the pending asynchronous large data transfer request to finish which is returned by the BeginTransfer method when the asynchronous operation is started, IAsyncResult. The EndTransfer method further return the large data transfer operation result. The Pause method is a method the requesting client calls to pause a specified asynchronous large data transfer operation.

The Pause method utilizes the reference to the pending asynchronous request to pause as returned by the BeginTransfer method when the asynchronous large data transfer operation is started, IAsyncResult. The Resume method is a method the requesting client endpoint calls to resume a paused specified asynchronous large data transfer operation. The Resume method likewise utilizes the reference to the pending asynchronous large data transfer request to resume as returned by the BeginTransfer method when the asynchronous large data transfer operation is started, IAsyncResult. The Cancel method is a method the requesting client calls to cancel a specified asynchronous large data transfer operation, and utilizes the reference to the pending asynchronous large data transfer request to cancel which was returned by the BeginTransfer method when the asynchronous large data transfer operation is started, IAsyncResult.

Figure 6:
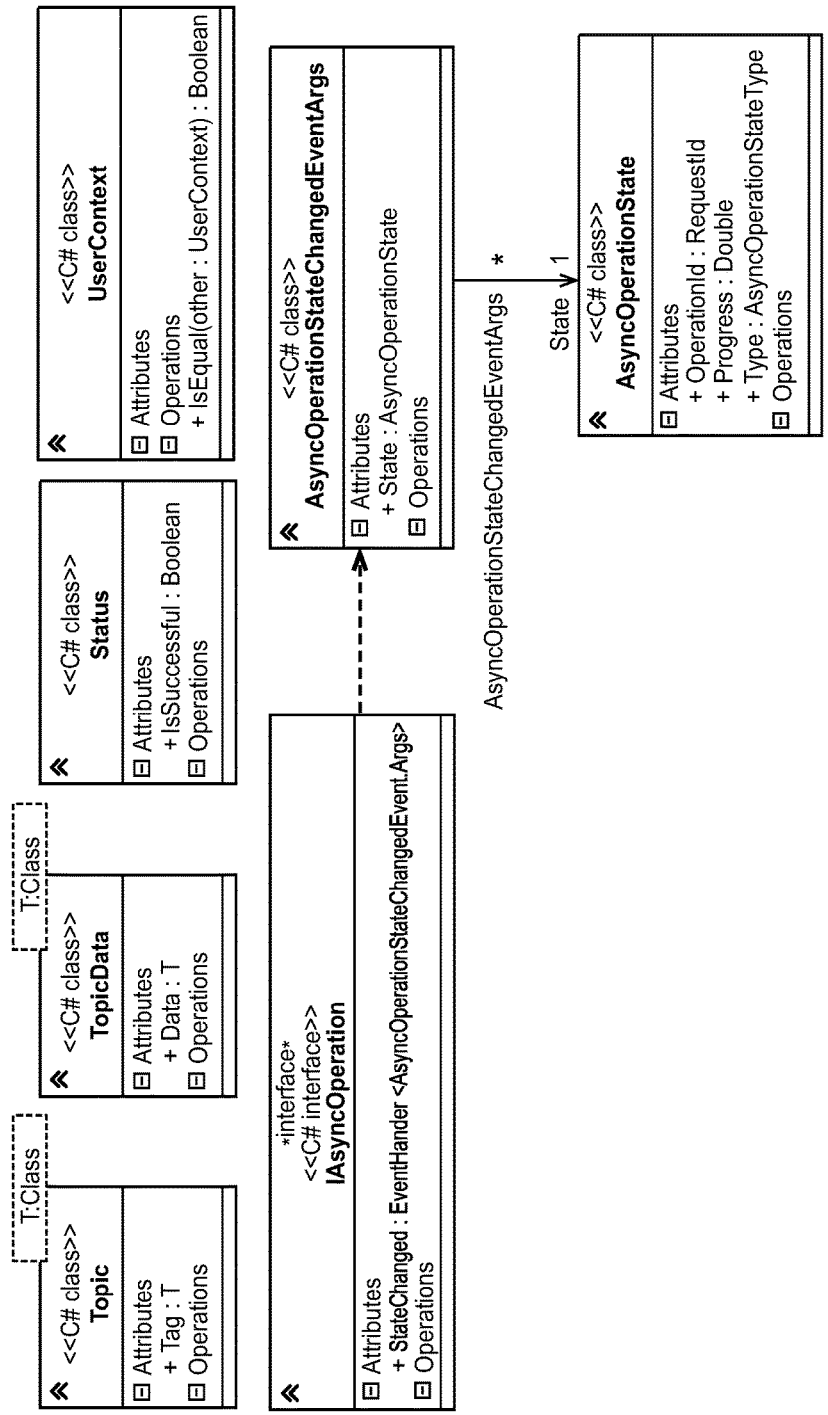
FIG. 6 is a depiction of exemplary common interfaces implemented by the process control messaging system architecture.

The following is an example for the process control messaging system architecture 300 creating, instantiating and initiating a large data transfer:
Create the Large data transfer specifier using the LargeDataTransferSpecifierBuilder:
    var specifier=LargeDataTransferSpecifierBuilder.Build (filePath, destinationPlatform);
Instantiate the TransferRequestSender:
    var ldtSender=new TransferRequestSender(localEndPoint, new ServerFactory( ));
Initiate the Transfer:
    var operation=ldtSender.BeginTransfer(specifier, ar=>{ }, null, true);
    operation.StateChanged+=(s, e)=>Console.WriteLine (e.State);
    var result=ldtSender.EndTransfer(operation);
    Console.WriteLine(("LDT operation result: {0}", result.Status.IsSuccessful);

FIG. 6 depicts an example of common interfaces implemented by the process control messaging system architecture 300. As seen in FIG. 6, the common interfaces include, but are not limited to, Topic, TopicData, Status, UserContext, IAsyncOperation, AsyncOperationStateChangedEventArgs and AsyncOperationState. The Topic interface is a class that represents the topic identifier and s used as Topic<string>. The TopicData interface is a class that represents the topic data. The Status interface is a status object used in responses, such as to guarantee (or not guarantee) delivery of a message. The UserContext interface is a class that contains user contect information. The UserContext interface further implements defined methods, IsEqual (UserContext), that compares one UserContext to another, and returns true if the contexts are the same. The IAsyncOperation interface represents an asynchronous operation and provides an event for the asynchronous operation state changing notification, StateChanged<AsyncOperationStateChangedEventArgs>, which occurs when an asynchronous operation state is changed. The AsyncOperationStateChangedEventArgs, in turn, is a class of asynchronous operation state changed arguments. The AsynchOperationState provides asynchronous operation state information with the properties of an asynchronous operation identificvation (OperationID), the type of asynchronous operation (Type), and the progress value of the asynchronous operation (Progress).

As noted with respect to FIG. 1, in some embodiments the server 150 may act as an enrollment server for registering and enrolling industrial computing devices 112, 113 in the process control messaging service. An administrator of the process control messaging service may register each industrial computing device. For example, newly-licensed industrial computing devices 112, 113 may be added to the process control messaging network, and registered at that time using a unique identifier associated with the industrial computing device. At this time, registration may define any restrictions or authorizations on the industrial computing device, including, but not limited to, subscriptions to other devices it may communicate with on the process control messaging network, restrictions to specific process control messaging services, etc. Further, in the case of a guest industrial computing device (e.g., as may be used by an external contractor working in the process control system) an industrial computing device may be restricted to temporary access to the process control messaging service, as opposed to permanent access. The registration process may also inform the industrial computing device of the network address of the enrollment server, such that the enrollment server is well-known to the industrial computing device.

In one embodiment, the enrollment service is provided using a communication module in the wireless interface of each device on the process control messaging network in communication with a single, well-known endpoint, such as the server 150. Each time an industrial computing device connects to the process control messaging network (e.g., via a wireless access point or via USB), the enrollment service verifies registration, performs notifications to other endpoints enrolled on the process control messaging based on subscription status (if any), and periodically pings the industrial computing device to maintain connection and enrollment status.

Figure 7:
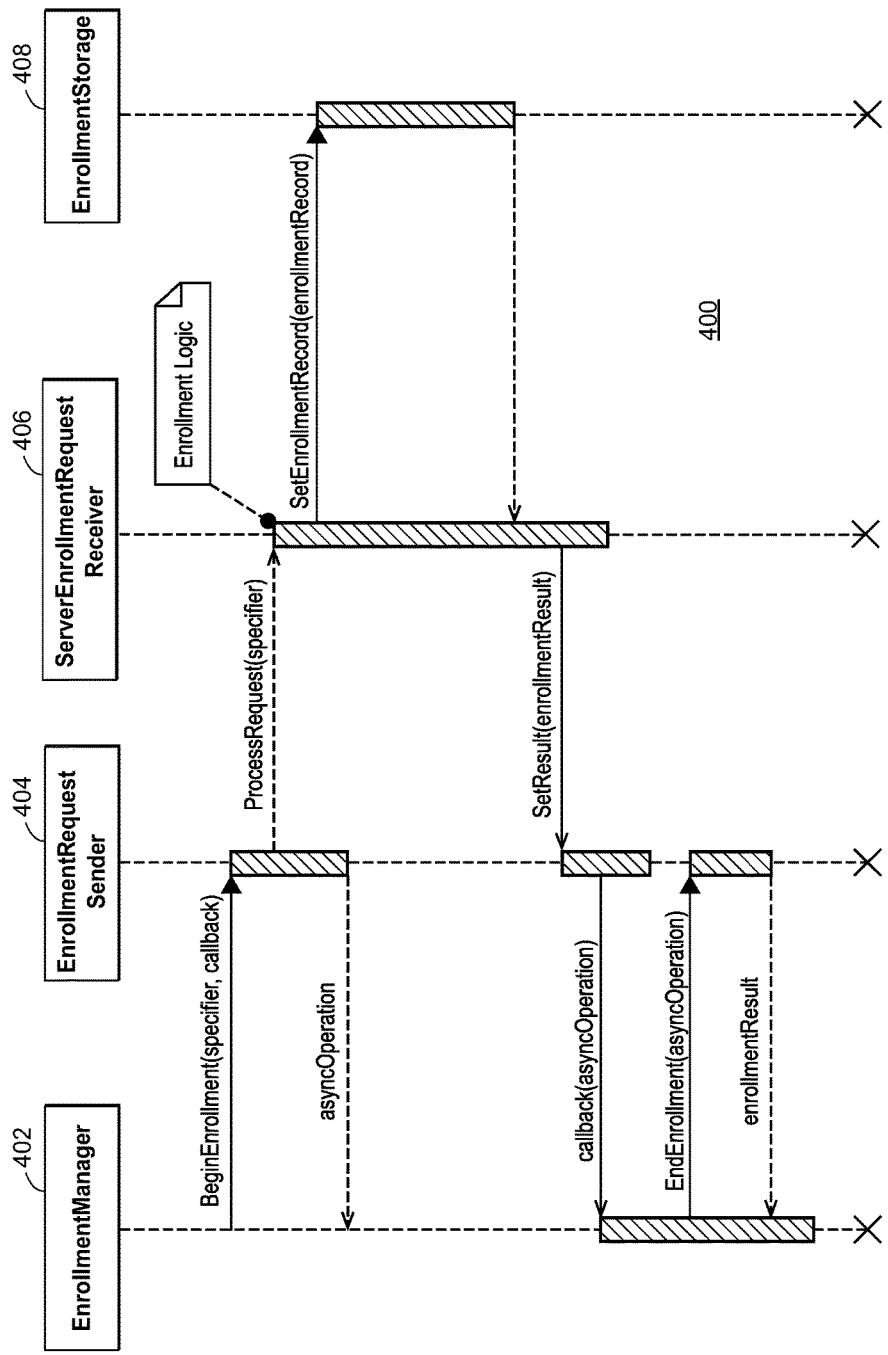
FIG. 7 is a sequence chart of an enrollment process between an industrial computing device and an enrollment server.

FIG. 7 depicts an example of the enrollment process 400 between an industrial computing device and the enrollment server 150. In one embodiment, the enrollment process 400 is the first activity after a platform, such an industrial computing device, starts/connects to the process control messaging system architecture 300. The platform is otherwise unable to perform any services offered by the process control messaging system architecture 300 without a successful enrollment. As mentioned, the enrollment server is a well-known endpoint to the different platforms. As such, in a multi-platform environment, there is a designated enrollment server that is capable of validating enrollment requests for all platforms when they connect and start up. The enrollment server is capable of querying services. such as licensing services, in order to validate connecting platforms.

Once there is a need for a registered industrial computing device to participate in the process control messaging network (i.e., as a client/endpoint), the registered industrial computing device, upon connection of the platform to the process control messaging network, begins the enrollment process as a local operation 402 by automatically initiating a request to the enrollment server for enrollment of the platform. The local operation attempts to reach the enrollment server 404. If the enrollment server is not available or not reachable, no enrollment is performed and no process control messaging services are possible at that time. Enrollment from a platform directly connected to a personal computer platform in a peer-to-peer relationship (e.g., USB cable connection) causes the personal computer platform to attempt to route (forward) the enrollment request to the enrollment server 150, provided the personal computer platform is not itself the enrollment server 150.

The enrollment server verifies the registration of the industrial computing device with the process control messaging service, and publishes the addresses of other devices on the process control messaging network based on the subscription status of the enrolled industrial computing device 406. The enrollment of the industrial computing device is recorded, with the enrollment server periodically pinging the industrial computing device to maintain enrollment connection and status 408. At this time, the enrollment server may notify the process control messaging services of the enrollment of the industrial computing device. For example, the enrollment service may notify an upgrade service that a specific industrial computing device has connected/enrolled, and the upgrade service can, in turn, inform the industrial computing device of any pending upgrades for its platform.

Having enrolled a registered industrial computing device 112 in the process control messaging service, the endpoints (i.e., destinations) become known to the enrolled (participating) device, as least insofar as allowed by the subscription status of the enrolled device, no matter if the endpoints are on the same physical devices (e.g., industrial computing device-to-industrial computing device), or different physical devices (e.g., industrial computing device-to-field device), or different platforms. Knowing the endpoints allows a participating industrial computing device to structure messages according to the destination platform. For example, if the participating industrial computing device is to communicate with a Fieldbus field device, the industrial computing device uses the process control communication protocol layer of the process control messaging system architecture 300 to generate the message in the Fieldbus protocol. Similar, if the participating industrial computing device is to communicate with a HART field device, the industrial computing device uses the process control communication protocol layer of the process control messaging system architecture 300 to generate the message in the HART protocol.

Once the message has been generated, the industrial computing device 112 uses the process control messaging protocol layer of the process control messaging system architecture 300 to wrap the generated message in the protocol of process control messaging service. In one embodiment, the message may be wrapped such that the message forms the payload of a packet in the protocol of the process control messaging service, with the process control messaging service protocol having a header with information on the process control communication protocol (e.g., Fieldbus, HART) and a network address or identification of the destination device.

Once the wrapped message is transmitted to the process control messaging network using the process control messaging protocol, the process control messaging network may unwrap, or decode, the message into the communication protocol of the destination device using the information in the header, and route/forward the unwrapped message to the destination device. Once the message is delivered to the destination device (platform), the message may be further routed to a particular process based on the message topic and/or application (discussed below). For example, based on a specified topic-application, the message is sent to the application for further processing. The application may optionally copy the message (or file, in the case of large data transfers), and then move the message to a particular process based on the topic designated in the message.

In an exemplary general scenario of an enrolled industrial computing device participating in the process control messaging service, a portable industrial computing device has need to participate in the process control messaging network in order to perform work activities. The industrial computing device is registered with and enrolled in the process control messaging network using the registration and enrollment services described above. Upon enrollment, a software application on the industrial computing device makes a request to a messaging service of the process control messaging services to establish communications with another industrial computing device. An inquiry is sent from the requesting industrial computing device to the well-known process control messaging service, and a listing of connected devices is queries and provided by the enrollment service. Using the process control messaging system architecture 300, the requesting industrial computing device generates and wraps its message for the destination device as described above. In turn, the destination device may use its process control messaging system architecture 300 to generate and wrap a response message.

Figure 8:
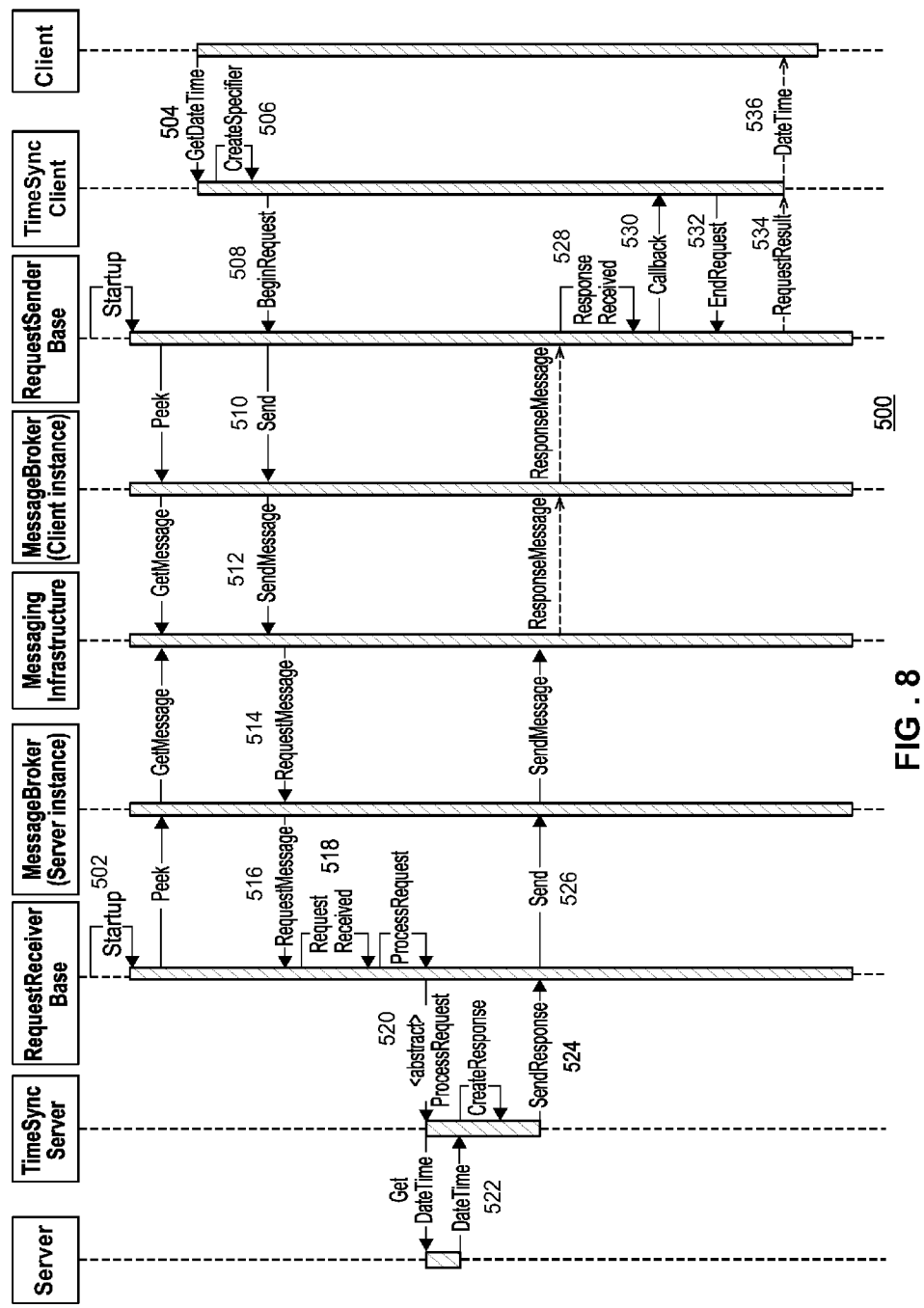
FIG. 8 is a sequence chart of a request/response operation between an industrial computing device and a time synchronization server.

FIG. 8 is a sequence diagram 500 depicting an example request/response operation. The particular request/response operation is for time synchronization of an industrial computing device having a client application as a requesting endpoint and a time synchronization server as the receiving endpoint, though it should be understood that the example scenario may be readily modified for other request/response operations using other client applications and services, including, but not limited to request/responses involving multiple endpoints (e.g., messaging multiple industrial computing devices 112, 113). Referring to FIG. 8, the TimeSyncServer performs initialization and bootstrapping of the RequestReceiverBase class 502. Thereafter, the endpoint client sends an asynchronous GetDateTime request 504, and the TimeSyncClient application supplies necessary specifiers 506. The TimeSyncClient calls the BeginRequest method of the RequestSenderBase 508, and the RequestSenderBase posts the request to the client instance of a MessageBroker 510. The client instance of the MessageBroker sends the message using the messaging infrastructure of the process control messaging system 512. On the server side, a server instance of MessageBroker receives the message from the messaging infrastructure 514, and the server instance of the MessageBroker returns the message to the RequestReceiverBase on a peek method call 516. The RequestReceiverBase receives the message 518, and calls its own abstract method ProcessRequest 520, which, as described above, is an abstract method to be implemented by the endpoint,TimeSyncServer, inheriting from the RequestReceiverBase. The server generates DateTime response 522, and the TimeSyncServer sends the response to RequestReceiverBase by the calling SendResponse method 524. The RequestReceiverBase posts the response to the server instance of the MessageBroker 526. The RequestSenderBase receives the response message and calls a Callback method 528. The TimeSyncClient receives the response via callback from BeginRequest 530, where the Callback method is implemented by the TimeSyncClient. The TimeSyncClient calls the EndRequest method of the RequestSenderBase 532, and the client receives a GetDateTime response 534. As another embodiment, once communications have been established, the software application of the requesting industrial computing device issues a request to the process control messaging services to transfer multiple large data files from the requesting industrial computing device to the destination industrial computing device. A listing of data files is requested by either the requesting or destination industrial computing device. A file transfer service is then activated based on the request.

Figure 9:
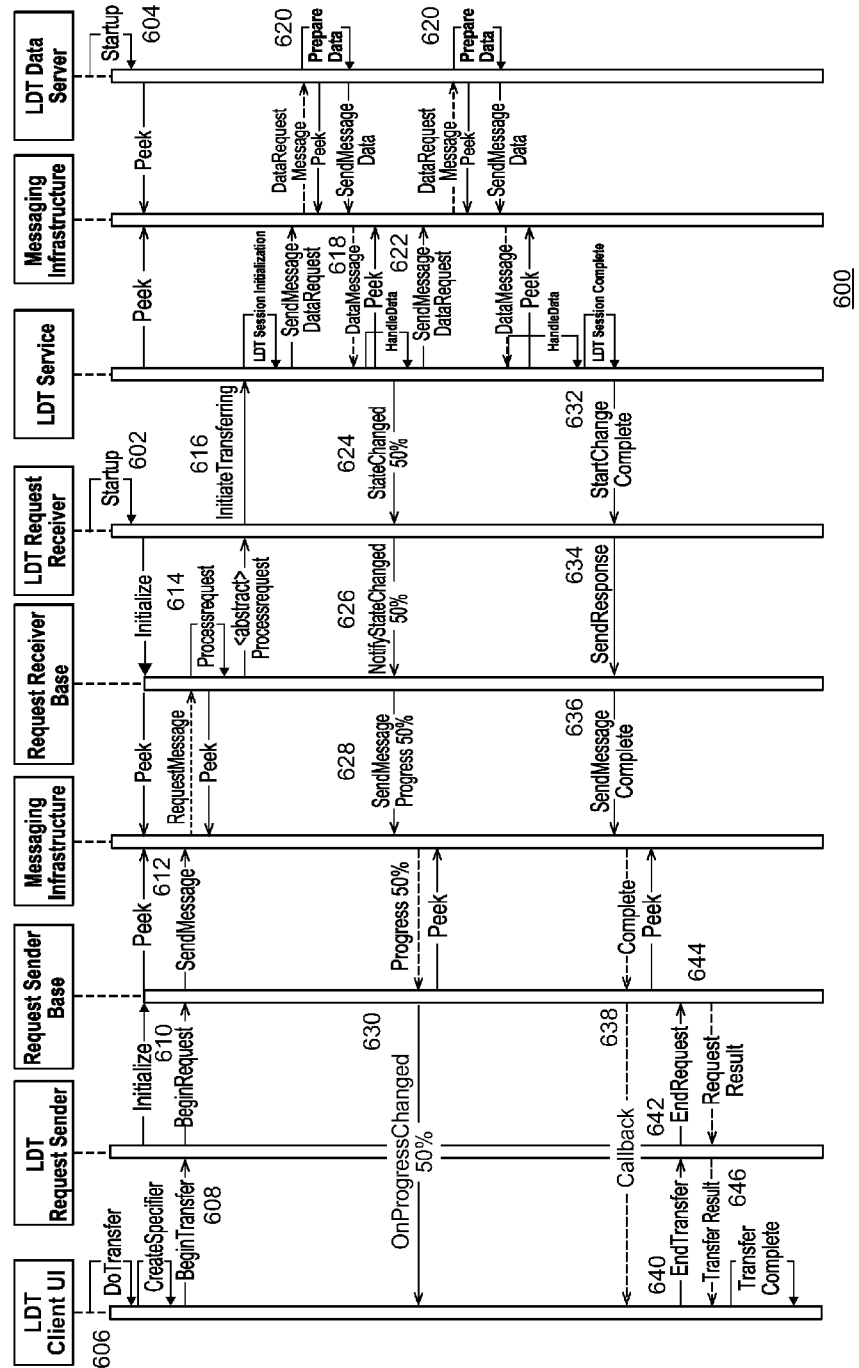
FIG. 9 is a sequence chart of a large data transfer operation between an source and destination.
Figure 10:
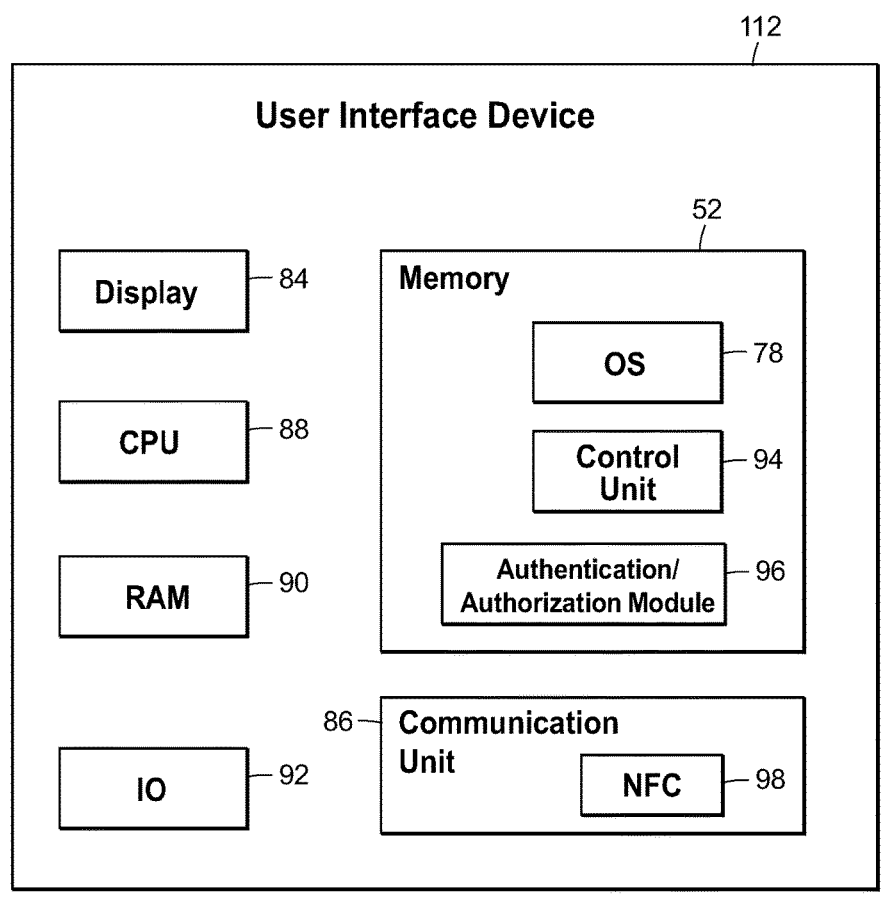
FIG. 10 is a block diagram of an example industrial computing device schematically illustrated in FIG. 1.

FIG. 9 is a sequence diagram 600 depicting an example large data transfer (LDT) operation. The particular large data transfer operation, though it should be understood that the example scenario may be readily modified for other large data transfer operations using other client applications and services, including, but not limited to large data transfers to multiple destinations (e.g., updates from the external cloud 210 to the industrial computing devices 112, 113). Referring to FIG. 9, an LDT client performs a large data transfer from LDT Source to LDT Destination. An LDT Request Receiver performs startup and initialization routines 602, and a LDT Data Server performs startup and initialization routines 604. The LDT Client starts a transfer operation 606, and the BeginTransfer method of the LDT Request Sender providing an LDTSpecifier with the LDT Source/Destination 608. The LDT Request Sender calls the BeginRequest method of the RequestSenderBase providing the RequestSpecifier 610. The RequestSenderBase sends the Request Message to the RequestReceiverBase using the messaging infrastructure 612, and the RequestReceiverBase receives the RequestMessage, processes it, and calls the ProcessRequest abstract method 614. The LDT Request Receiver ProcessRequest method implementation calls the InstantiateTransferring message of the LDT Service 616, and the LDT Service creates a transfer session and sends the data request message to the LDT Data Server using the messaging infrastructure 618.

The LDT Data Server receives the Data Request Message, handles it, and sends Data to the LDT Service via the messaging infrastructure 620. In turn, the LDT Service receives the Data, handles it, and sends a data request message for the next portion of the Data 622. The LDT Service generates a StateChanged event 624, and the LDT Request Receiver calls the NotifyStateChanged method of the RequestReceiverBase 626. The RequestReceiverBase NotifyStateChanged method implementation sends the progress message to the RequestSenderBase using the messaging infrastructure 628. The RequestSenderBase receives the Progress message and generates a ProgressChangedEvent 630.

The LDT Service, upon handling the last portion of the Data, closes the LDT session and generates the StateChanged(Complete) event 632, and the LDT Request Receiver calls the SendResponse method of the RequestReceiverBase 634. The RequestReceiverBase SendResponse method implementation sends a RequestComplete message to the RequestSenderBase using the messaging infrastructure 636. The RequestSenderBase receives the RequestComplete message and calls the LDT Client's callback method 638, and, in turn, the LDT Client calls the EndTransfer method of the LDT Request Sender 640. The LDT Request Sender calls the EndRequest method of the RequestSenderBase 642, and the RequestSenderBase returns the RequestResult on the EndRequest method 644. The LDT Request Sender returns the Transfer Result on the EndTransfer method 646.

Further embodiments, which should be understood from the above example, may likewise be implemented after enrollment using the process control messaging system. For example, the software application of the requesting industrial computing device issues a request to the process control messaging service to begin real-time/instant messaging with a destination industrial computing device. The registration service of the process control messaging service provides a listing of connected/enrolled devices to the requesting industrial computing device. The requesting industrial computing device is then capable of peer-to-peer messaging with the enrolled destination industrial computing device.

Once the software application of the requesting industrial computing device is done with the process control messaging services, the software application issues a request to end communications with the other device. In some cases, connected device has lost connection with the network. In either case, the registration service updates its internal connected/enrolled devices list. A notification is provided indicating the device is no longer connected to the process control messaging network.

FIG. 6 illustrates a block diagram of an example industrial computing device 112, 113. The industrial computing device 112, 113 may be a handheld device or a portable computing device such as a laptop computer, a tablet computer, a mobile device smart-phone, a personal digital assistant (PDA), a wearable computing device, etc. The industrial computing device 112, 113 may include a display 84, one or more processors or CPUs 88, a memory 52, a random-access memory (RAM) 90, an input/output (I/O) circuit 92, and a communication unit 86 to transmit and receive data via a local area network, wide area network, or any other suitable network. The communication unit 86 may include an NFC or RFID reader 98 to receive and decode NFC or RFID signals. The industrial computing device 112, 113 may communicate with the controllers 11, the server 150, and/or any other suitable computing device.

The memory 52 may include an operating system 78, a control unit 94 for controlling the display 88 and communicating with process control devices, and an authentication/authorization module 96 for authenticating a user and determining a level of authorization for the user. In some embodiments, the authentication/authorization module 96 may determine whether a user has access to a connected process control device as well as the types of operations the user is authorized to perform on the connected process control device. Once it is determined that the user is authorized to execute a particular function to perform an operation on the connected process control device (e.g., a configuration function), the control unit 94 may control configuration of the connected process control device by receiving inputs from the user, displaying outputs from the connected process control device, and communicating with the connected process control device to adjust settings on the connected process control device.

To authorize users and industrial computing devices to access process control devices, the server 150 generates permissions which specify a level of access to a particular process control device. For example, a first permission may allow access to Field Device A for reading data from the device and for executing monitoring functions. A second permission may allow access to Field Device B for reading and writing data to the device and for executing calibration and configuration functions. Additionally, the second permission may specify a time duration (e.g., 1 hour) and a plant area in which the user may access the process control device. In some embodiments, a system administrator may interact with the server 150 to generate the permissions.

In addition to generating the permissions, the server 150 may assign each permission to one or several users and to one or several industrial computing devices. For example, the system administrator may grant the first permission to a first subset of users and a first subset of industrial computing devices in the process plant. In some scenarios, each user who is granted the same permission may have a same or similar job function with the process plant. For example, each of the maintenance technicians in a process plant may be assigned the same permissions. In some embodiments, the indications of permissions, users in the process plant, industrial computing devices within the process plant, and associations between the permissions, users, and industrial computing devices may be stored in one or several databases communicatively coupled to the server 150.

Figure 11:
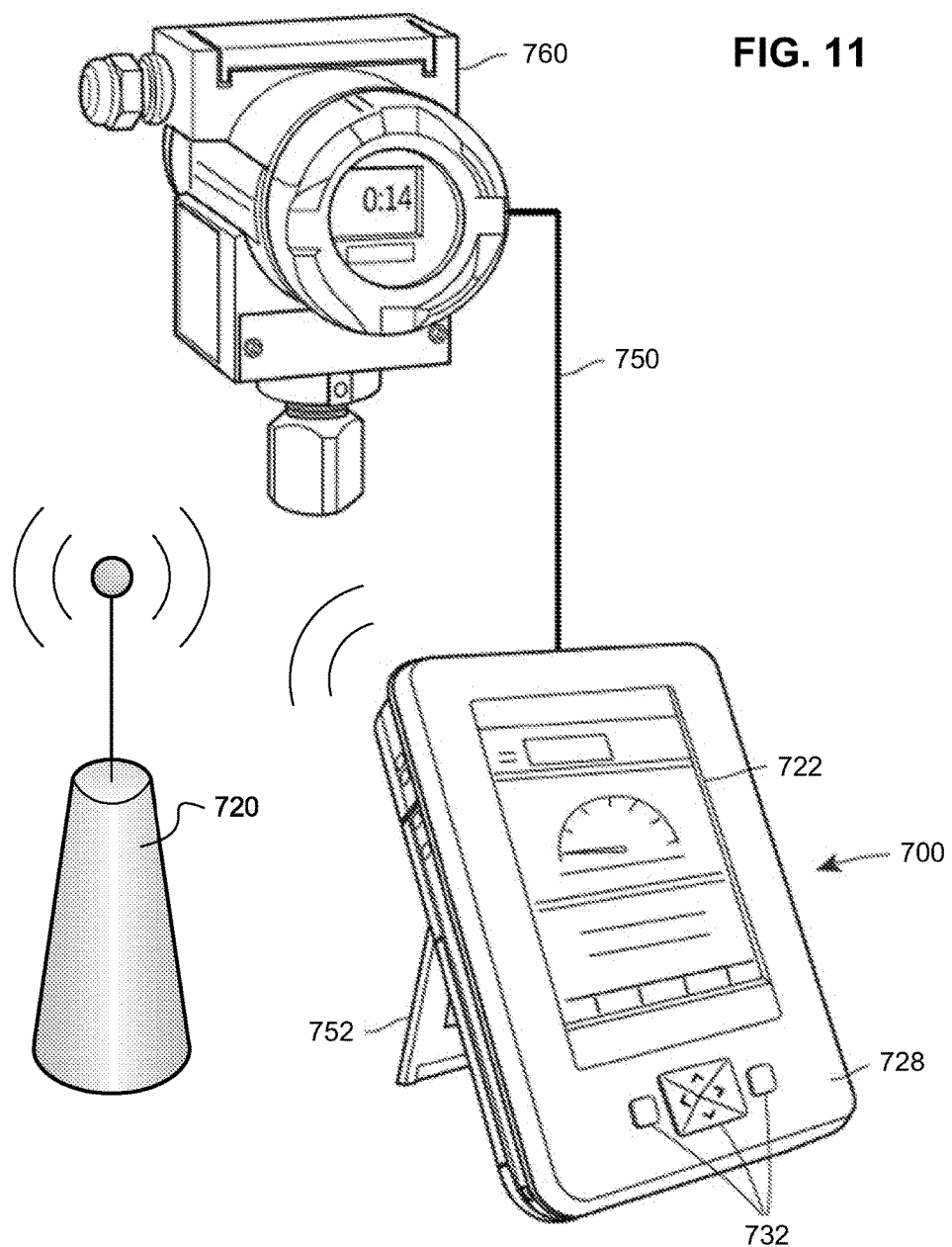
FIG. 11 depicts an example portable field maintenance tool connected to a field device and wirelessly coupled to a process control messaging system.

FIG. 11 depicts an example portable industrial computing device 112, such as a portable field maintenance tool 700 ("tool 700"), that may be directly connected to a process control device, such as a field device 760, via a wired communication link or channel 750 and/or indirectly connected to the field device 760 via a wireless communication channel of a process control asset management system. In this particular example, the portable field maintenance tool 700 is shown as a handheld field maintenance tool. In one embodiment, when the tool 700 is wired to the terminals of the field device 760, the tool 700 is capable of not only communicating with the field device 760, but of also powering the field device 760. In such an embodiment, the tool 700 may utilize a single composite signal, transmitted via the link 750, for both powering and communicating with the field device 760. In another embodiment, when the tool 700 is communicatively coupled to the process control messaging network 200 via a wireless communication channel (e.g., via an access point 720), the tool 700 may utilize the process control messaging services to communicate with the field device 760 via a process control asset management system used to manage the field device 760. Although shown as communicatively coupled via a wireless communication channel to the access point 720, the tool 700 may directly or indirectly communicatively couple to the process control messaging network 200 via a wired communication channel (e.g., Ethernet), either to an access point that provides a wired connection, a wireless gateway that provides a wired connection, or via another computing device (e.g., a personal computer) with a wired or wireless connection to the process control messaging network 200.

In some cases, the tool 700 can diagnose problems with the field device 760 or with a communication link/channel in the plant environment to which the field device 760 is connected (e.g., a HART loop or Fieldbus segment; not shown). In some instances, the tool 700 may communicate with or diagnose field devices configured according to different protocols. For example, the tool 700 may be capable of communicating with, and diagnosing traditional 4-20 field devices, HART field devices, and Fieldbus field devices. Unlike many prior art portable testing units that force a user to utilize multiple devices and/or to connect multiple cables and wires to various different terminal sets if he or she wants to communicate with a field device, and perform diagnostics on signals sent or received by the field device, the tool 700 may utilize a single communication connection with the process control messaging network 200 to diagnose, commission, control or otherwise communicate with the field device 760. As such, the tool 700 may indirectly communicate with the field device 760 without having to expose, or physically connect to, communication terminals on the field device.

Moreover, the tool 700 may be energy limited and fault tolerant sufficient to comply with intrinsic safety (IS) standards. For example, the tool 700 may be designed so that all components of the tool 700 and so that all signals (e.g., including power and/or communication signals) transmitted and/or received by the tool 700 are energy limited to ranges compliant with IS standards. Further, the tool 700 may "self-monitor" components of the tool 700 and/or signals transmitted or received by the tool 700 to ensure that the components and/or signals remain IS compliant. To illustrate, the tool 700 may disable one or more components (or disable the tool 700 entirely) when a component or signal approaches or exceeds a threshold associated with IS standards. Accordingly, when the tool 700 is IS compliant, a user can connect the tool 700 to the field device 760 or to a link (e.g., a HART loop or Fieldbus segment) to which the field device 760 is connected with confidence that he or she will not violate IS standards and with confidence that he or she will not ignite an explosive atmosphere. In short, unlike many traditional portable power supplies and PTDs, the tool 700 may safely be used in hazardous areas.

As noted, the tool 700 may operate in compliance with IS standards. That is, the tool 700 may safely be used in hazardous areas because the components of the tool 700 may be energy limited and fault tolerant in accordance with IS standards. For example, the components of the tool 700 may be (i) current limited to a current limit (e.g., 250 mA, 300 mA, 350 mA, etc.) (ii) voltage limited to voltage limit (e.g., 25 V, 29 V, 35V, etc.) and (iii) power limited to a power limit (e.g., 1 W, 1.3 W, 1.5 W, etc.). The tool 700 may have one or more built-in redundancies (e.g., automatic shutdown, redundant components, etc.) to ensure that component failure does not result in these energy limitations being exceeded.

The tool 700 may include any one or more of: a display 722, a housing 728, input keys 732, and a folding stand 752. The housing 728 may be shaped and sized as a handheld unit. The housing 728 may have a generally rectangular cubic shape, or any other desirable shape or size (e.g., 5 inches, 7 inches, or 11 inches measured diagonally).

The display 722 and input keys 732 may be disposed on a front face of the housing. The display 722 may be a touchscreen, such as a capacitive touchscreen that detects touch input via capacitive sensing, or a resistive touchscreen that detects touch input via applied pressure. The input keys 732 may be physical keys, such as push buttons or multidirectional buttons. In some cases, the tool 700 does not include the input keys 732.

The folding stand 752 may pivot between a flat position against the back of the housing 728 and an outwardly pivoted position from the back of the housing 728. In the flat position, a user can carry the tool 700 and use the tool 700 in a similar manner that one would use a tablet. In the outwardly pivoted position, the folding stand 752 can be used to prop the maintenance tool 700 in an upright position. In some instances, the tool 700 does not include the folding stand 752.

Figure 12:
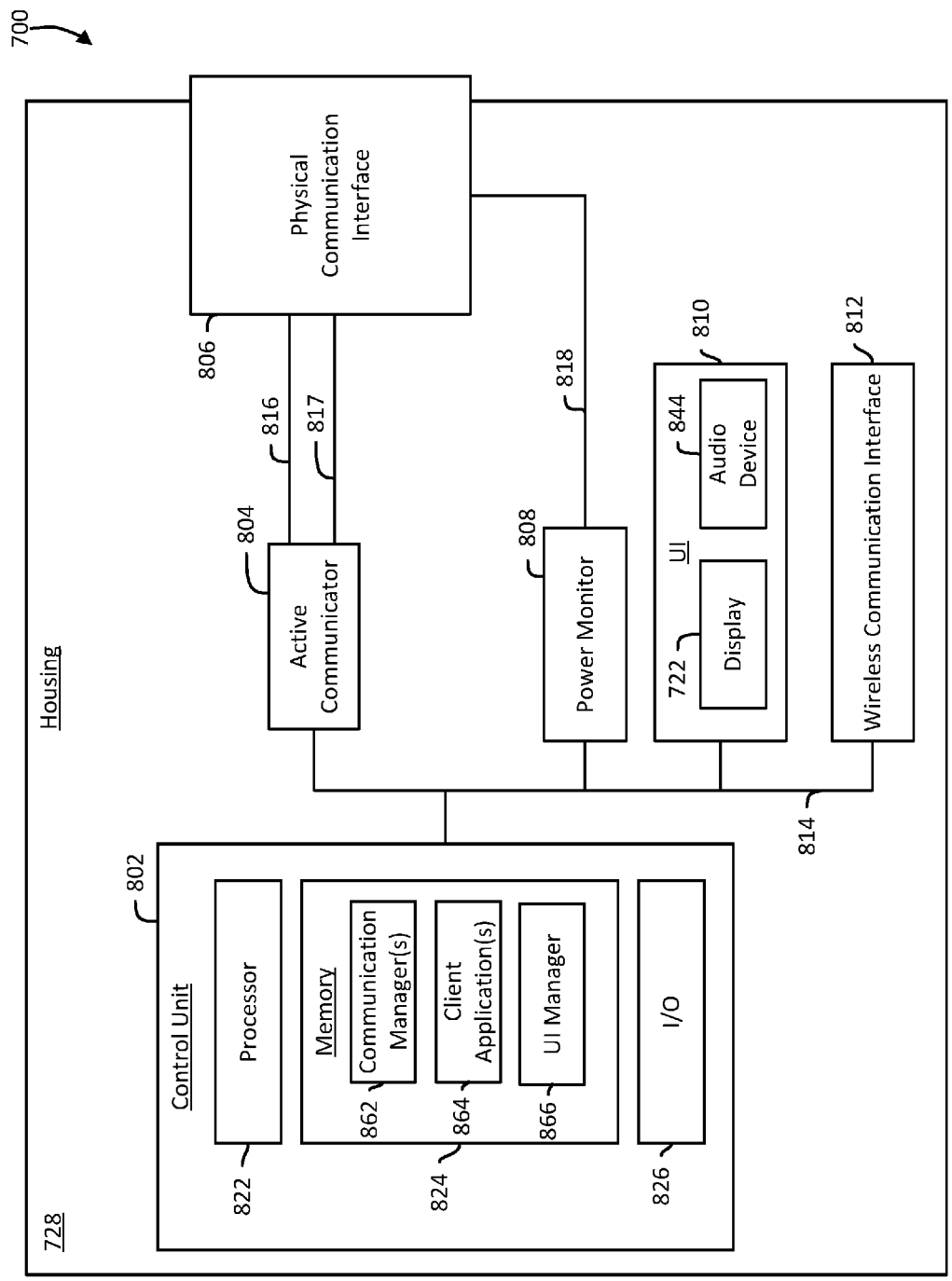
FIG. 12 is a block diagram of the portable field maintenance tool shown in FIG. 11, depicting an example in which the portable field maintenance tool includes an active communicator for powering and communicating with field devices, and for wirelessly communicating via the process control messaging system.

FIG. 12 illustrates a more detailed block diagram of an example tool 700. In this embodiment, the tool 700 includes an active communicator 804 and a physical communication interface 806 electrically connected via electrical connections 816 and 817 to the active communicator 804 so that the active communicator 804 can power and communicate with the field device 760 via the physical communication interface 806, as well as measure one or more electrical characteristics of signals sent or received by the active communicator 804. As shown, the communication interface 806 may be disposed through the housing 728, such that an external portion of the interface 806 is accessible outside the housing 728, enabling the wired communication link 750 and field device 760 to be connected to the interface 806.

The active communicator 804 enables the tool 700 to communicate with the field device 760, diagnose the field device 760, power the field device 760, and/or diagnose a communication link in a plant environment to which the field device 760 is connected (not shown). In some cases, the active communicator 804 may be configured to communicate with and diagnose multiple different types of field devices (e.g., HART field devices and Fieldbus field devices), and/or may be configured to comply with IS standards so that it can be used to communicate with, diagnose, and power field devices located in hazardous areas. One or more power supplies of the active communicator 804 may include switches for disabling the power supplies.

The active communicator 804 may include a power supply for supplying power to the field device 760, a signal encoder and decoder (e.g., a modem) for communicating with the field device 760, and/or energy measurement circuitry (e.g., a voltmeter and/or ammeter) for measuring electrical characteristics of signals sent and received by the active communicator 804. The active communicator 804 may transmit or receive communication signals to or from the field device 760 via the electrical connections 816 and 817. The active communicator 804 may encode communication signals by modulating a current magnitude or a frequency to represent an analog or digital value, and may superimpose the communication signal on a power signal to create a composite signal. In some cases, the tool 700 does not include the physical communication interface 808.

The tool 700 may include a control unit 802, communicatively coupled to the active communicator 804 via a communication bus 814, configured to control and monitor the active communicator 804. At a high level, the control unit 802 may activate and deactivate components of the active communicator 804 to: (i) configure the active communicator 804 so that it remains energy limited in accordance with IS standards; (ii) configure the active communicator 804 to communicate according to a desired communication protocol (e.g., HART or Fieldbus); (iii) configure the active communicator 804 in response to a connection made at the physical communication interface 806 (e.g., based on whether a user connects the communication link 750 to a terminal set for HART or a terminal set for Fieldbus); and/or (iv) configure the active communicator 804 for a particular field device configuration or field device type (e.g., actuator or transmitter). Generally speaking, a transmitter is a field device configured to obtain a measurement (e.g., via a temperature sensor, pressure sensor, flow sensor, level sensor, etc.) and to transmit the measurement. The field device configuration or type may be determined based on user input or based on communication with the connected field device.

The control unit 802 may include a processor 822, a memory 824 storing one or more routines, and an I/O interface 826 communicatively coupled to other components of the tool 100 via the bus 814. The routines stored at the memory 824 may include a communication manager routine 862 for activating and deactivating components of the active communicator 804 as described above and a client application routine 864 that communicates with the field device 760.

The tool 700 may also include a user interface ("UI") 810, communicatively coupled to the control unit 802 via the bus 814, for providing a user interface and/or for detecting user input received at the UI 810 (e.g., touch input). The control unit 802 may provide the user interface at the UI 810 and detect the user input at the UI 810 by executing a UI manager 866 stored at the memory 824. The UI 810 may include the display 722 shown in FIG. 11, where the control unit 802 may render visual output; and an audio device 844 for providing audio output. For example, the UI 810 may render a graphical user interface that enables a user to select an asset management system, select a field device, select a communication protocol for communicating with the field device, to select a command to transmit to the field device, to view information transmitted from the field device to the tool 700, etc. The audio device 844 may generate audio alarms or notifications, for example, in response to alarms transmitted by the field device 760.

Further, the tool 700 may include a power monitor 808 (e.g., an ammeter), communicatively coupled to the control unit 802 via the bus 814, for measuring a current or voltage associated with the communication link 750 connected to the interface 806. The diagnostics manager 864 of the control unit 802 may utilize the power monitor 808 to measure a signal transmitted and/or received by the tool 700 to determine whether the signal has electrical characteristics within an expected range for a particular protocol. For example, if a user utilizes the tool 700 to attempt to command a HART valve to open to 50%, the power monitor 808 may be utilized to verify that the transmitted signal has a current at or near a level that will enable the HART valve to properly interpret the signal (e.g., 12 mA). The UI manager 864 may display measurements obtained by the power monitor 808. In some cases, the tool 700 does not include the power monitor 808. However, regardless of whether the tool 700 includes the power monitor 808, the tool 700 may rely on electrical measurements obtained by the active communicator 804.

The tool 700 may also include a wireless communication interface 812, communicatively coupled to the control unit 802 via the bus 814, for transmitting and/or receiving wireless signals, enabling the tool 700 to communicate with other components of the plant, including the wireless access points 720, via wireless communication channels within the plant. The wireless interface 812 may support one or more suitable wireless protocols, such as Wi-Fi (e.g., an 802.11 protocol), Bluetooth (e.g., 2.4 to 2.485 GHz), near-field communications (e.g., 13.56 MHz), high frequency systems (e.g., 900 MHz, 2.4 GHz, and 5.6 GHz communication systems), etc.

Figure 13:
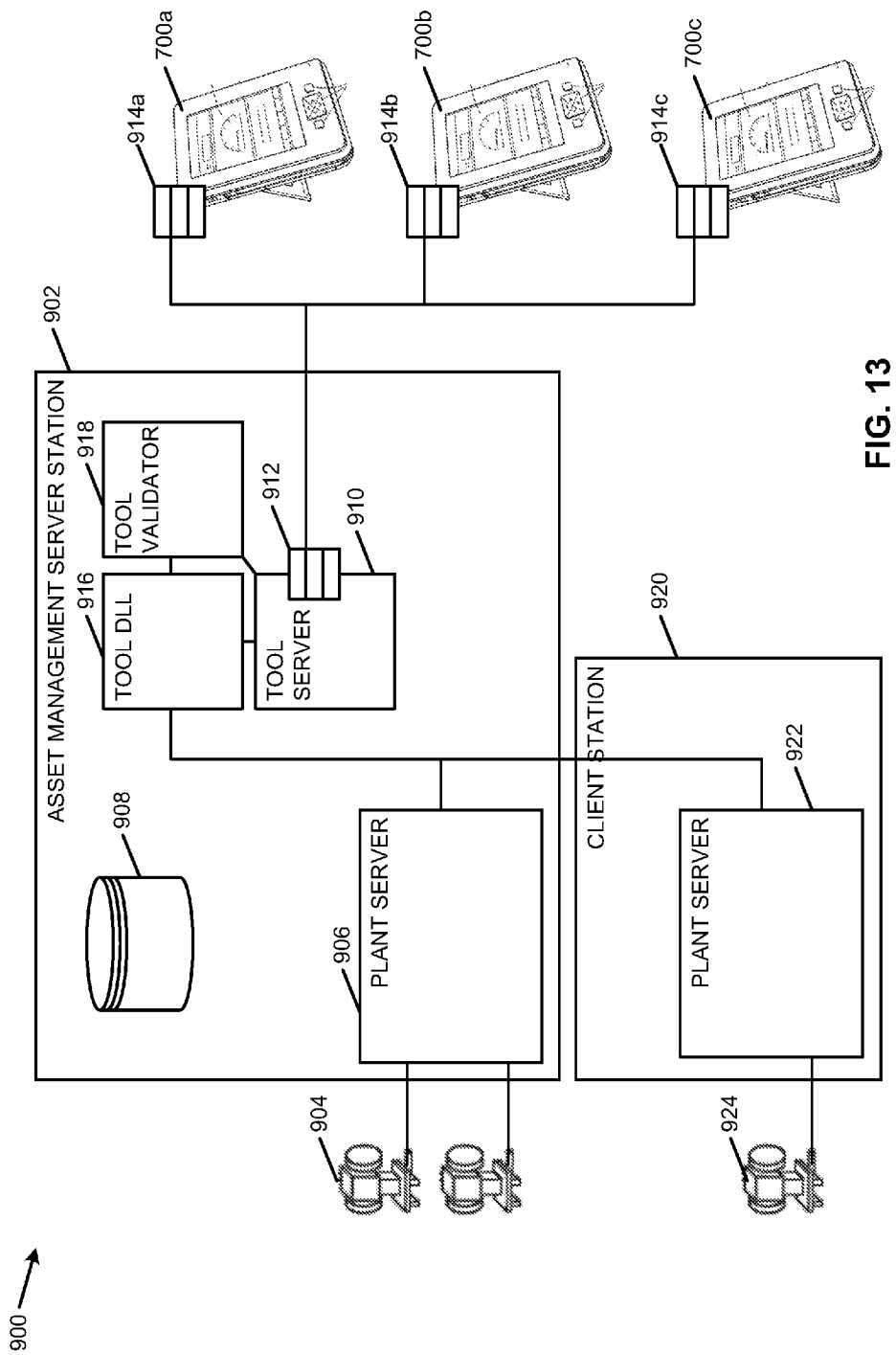
FIG. 13 is a block diagram of portable field maintenance tools in communication with an asset management system, including the components of the asset management system for communicating with the portable field maintenance tool.

FIG. 13 illustrates a block and schematic diagram of the tool s 700*a*-700*c* (individually referred to as "tool 700") in communication with a process control asset management system 900, such as, for example, AMS Suite™ or AMS Device Manager™ systems sold by Emerson Process Management. The portable industrial computing device 112 communicatively coupled to the backbone 105 in the upper left of FIG. 1 may correspond to the tool 700. In the example shown in FIG. 13, the asset management system 900 includes an asset management server 902, such as an asset management server station. The server 150 of FIG. 1 or an industrial computing device at the plant network level (e.g., the workstation 268) may be implemented as an asset management server station. In one embodiment, the asset management server 902 is a standalone station running asset management routines for controlling, diagnosing, predicting, documenting, configuring and otherwise managing one or more field devices 904 thereto through plant servers, modems (e.g., a HART modem) and various system interfaces 906. The field devices 904 are connected to the system interfaces 906 via a digital process communication channel, such as the plant network 204 and control network 206. Although depicted as one server, the asset management server 902 may be provided as multiple servers, such as an array of servers or individual servers. The asset management server 902 includes a database 908 with information on each of the field devices, industrial computing devices, users, device permissions and/or user permissions in the overall asset management system 900. The asset management server 902 runs the asset management applications, such as the AMS Device Manager™ application sold by Emerson Process Management.

In order for the tools 700a-700c to communicate with the asset management system 900, the asset management server 902 includes a field maintenance tool communication server 910. Although depicted as one server, the tool communication server 910 may be provided as multiple servers, such as an array of servers or individual servers, to accommodate any number of tools. The tool communication server 910 may be used for any industrial computing device, and particularly for portable industrial computing devices, that require connection to or communication with the asset management system 900. The tool communication server 910 includes a process control messaging system architecture 912 similar to the process control messaging system architecture 300 described above, where the process control messaging system architecture is represented as a layer of abstraction having a dedicated communication protocol of the process control messaging service above the network communication protocol, and a process control communication protocol (e.g., Fieldbus, HART, etc.) layered above the communication protocol of the process control messaging service. Each tool 700a-700 likewise has a corresponding process control messaging architecture 914a-914c (individually referred to as "process control messaging architecture 914"). Using the process control messaging architecture 912, 914a-914c, the tool communication server 910 and tools 700a-700c, respectively, is each able to generate a message in the process control communication protocol of the destination device (e.g., Fieldbus, HART, etc.), wrap the message in the communication protocol of the process control messaging service, and transmit the wrapped message according to the network communication protocol defined in the transport layer.

The tool communication server 910 links to a tool dynamic shared library 916 that provides the interfaces for the tools 700a-700c to connect to a field device 904, send commands to the field device 904, receive responses from the field device 904 and disconnect communications with the field device 904. In the embodiment shown in FIG. 13, the dynamic shared library 916 is a dynamic link library linked to the tool communication server 910 and to a validation tool 918 for validating each of the tools 700a-700c as registered with the asset management system 900 and enrolled in the process control messaging service. The validation tool 918 may further validate the tool and a user of the tool as authorized to communicate with a requested field device based on previous registration and/or enrollment of the tool.

As mentioned, although the embodiment of FIG. 13 is shown as the asset management server 902 being a stand-alone server, the asset management system 900 may include multiple asset management servers, such as an array of servers or individual servers, to accommodate any number of field devices 904. For example, in a further embodiment, the asset management system 900 may be a distributed system in which the asset management server station 902 is operatively coupled to one or more client stations 920, via a wired or wireless connection, such as the workstations 260 of FIG. 2. Each client station 920 may act as an asset management server station that executes asset management applications and plant servers, modems (e.g., a HART modem) and various system interfaces 922. Field devices 924 may be connected or otherwise communicatively coupled to the system interface(s) 922 of any client station 920 via the digital process communication channel. Each client station remotely accesses the database 908 on the asset management server 902, and the dynamic shared library 916 routes between the tool communication server 910 and the field devices 924 connected to the client station 920. In some embodiments, the client station 920 may be a mobile workstation connected to the asset management server 902 through a wireless network connection.

Figure 14C:
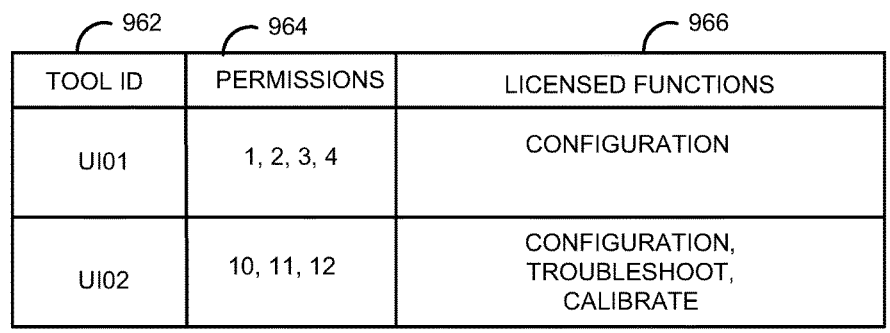

FIGS. 14A-14C illustrate example data tables which may be generated by the asset management server 902 and stored in one or several databases, such as the database 908, or in the tool validator 918. The example data tables are shown for illustrative purposes only, and the associated functionality may be implemented using any suitable format and/or design for generating, storing, and retrieving permissions, users, industrial computing devices, and associations between the permissions, users, and industrial computing devices. Accordingly, the permissions and associations between the permissions, users, and industrial computing devices may be generated, stored, and retrieved in any suitable manner. Moreover, while each data table includes a few entries, this is merely for ease of illustration. Each data table may include tens, hundreds, thousands, or any suitable number of data entries.

FIG. 14A illustrates an example permissions data table 930 which includes indications of several permissions. Each permission may include a permission ID 932 which uniquely identifies the permission. Each permission may also include a process control device 934 which may be accessed via the permission (e.g., Field Device A, Field Device B) and a type of access for the permission 936 (e.g., read-only, read/write). Additionally, the permissions may include an area of the plant in which the access is permitted 938 (e.g., Plant Area A, Plant Area B). The area may be a particular room within the process plant, may be determined using a threshold radius around the location of a particular process control device, may be a building within the process plant, or may be any other suitable area. In this manner, a user may access a particular process control device only when the user is proximate to the process control device. Some permissions may indicate that access is permitted for all areas.

Furthermore, the permissions may include functions 940 which the user is allowed to execute to perform operations on the corresponding process control device (e.g., configure, calibrate, troubleshoot, monitor, control). In some embodiments, the functions may be based on the type of access included in the permission 936. For example, if the permission includes read-only access, the user may not be able to execute a configuration function which requires writing to the process control device. The functions may be software applications on an industrial computing device controlled by the user or may be capabilities of a software application. For example, the permissions may specify which software applications the user may access on the industrial computing device when the industrial computing device is connected to, or requesting connection to, a particular process control device. The permissions may also specify which capabilities are accessible to the user using a particular software application. Some permissions may indicate that access is permitted for all functions.

Moreover, each permission may include a time duration 942 in which a corresponding process control device may be accessed. The time duration can be infinite or may include a threshold time for the access (e.g., 30 minutes, 1 hour, 3 hours, etc.). In this manner, a user may have access to a process control device for a threshold duration, and when the time expires the user may no longer be able to interact with the process control device. Duration may also be scheduled according to a particular or recurring day, week, month, etc. (e.g., every other Tuesday).

While the example permissions data table 930 includes permission ID 932, device 934, access types 936, plant area 938, functions 940, and duration 942 data fields, additional, fewer, or alternative data fields may be included with each permission. In some embodiments, the permissions may be generated by a system administrator via a user interface on the asset management server 902.

In addition to the generating the permissions, the asset management server 902 may assign the permissions to users and industrial computing devices in the process plant. A user who is assigned a permission may be granted access to the process control device included in the permission when using an industrial computing device. In some embodiments, the industrial computing device may also need to be granted access to the process control device for the user to access the process control device when using the industrial computing device. In other embodiments, when one of the user and the industrial computing device is granted permission to access the process control device, the user may access the process control device via the industrial computing device.

In any event, FIG. 14B illustrates an example users data table 950 which includes indications of several users who work in the process plant. The users data table 950 may be used to generate user profiles for each of the users. Each user may have a user ID 952 which uniquely identifies the user (e.g., 0001, 0002, 0003, XXY, AAC, etc.). Each user may also have an associated job function 954 within the process plant (e.g., configuration engineer, maintenance technician, etc.).

A group of users may also be assigned to a security group 956, where each of the members of a security group may be assigned the same permissions. For example, a first security group may include permissions 1-4. When a user is assigned to the first security group, the user is also automatically assigned each of permissions 1-4. In this manner, a system administrator does not have to individually assign a same set of permissions to several users.

The system administrator may assign permissions to a security group via a user interface on the asset management server 902. For example, the system administrator may view indications of permissions previously assigned to the security group and enter in an identifier for a new permission to assign to the security group (e.g., a permission ID), select the permission from several permissions in a drop-down menu, or assign the permission to the security group in any other suitable manner.

In some embodiments, members of a security group may include users who share a common attribute within the process plant, such as a same job function or role within the process plant. For example, a first security group may be for configuration engineers, a second security group may be for maintenance technicians, a third security group may be for plant operators, etc. Additionally, users may be assigned to multiple security groups or may be provided with temporary access to various security groups. For example, when a user is required to perform an additional job function outside of her normal job function temporarily, the user may be assigned to another security group for the additional job function while the user is also assigned to the security group for her normal job function.

In some embodiments, a user is automatically assigned to a security group based on the user's job function. In other embodiments, the system administrator assigns the user to a security group via a user interface on the asset management server 902. For example, the system administrator may view a user profile for the user and enter in an identifier for the security group, select the security group from several security groups in a drop-down menu, or assign the user to a security group in any other suitable manner.

The users data table 950 may also include indications of permissions 958 assigned to each user. In some embodiments, the permissions assigned to a user may correspond to the permissions assigned to the user's security groups. When a user does not belong to a security group or in addition to the permissions assigned to the security groups, the indications of permissions may also include permissions individually assigned to the user.

The system administrator may assign permissions to a user via a user interface on the asset management server 902. For example, the system administrator may view a user profile for the user and enter in an identifier for the permission (e.g., a permission ID), select the permission from several permissions in a drop-down menu, or assign the permission to the user in any other suitable manner.

While the example users data table 950 includes user ID 952, job function 954, security group 956, and permissions 958 data fields, additional, fewer, or alternative data fields may be included for each user. For example, the users data table 950 may also include a name data field, a date of birth data field, a home address data field, a work start date data field, username and password data fields, etc.

FIG. 14C illustrates an example industrial computing devices data table 960 which includes indications of industrial computing devices within the process plant. Each industrial computing device may have an industrial computing device ID 962 which uniquely identifies the industrial computing device (e.g., UI01, UI02, UI03, XXX, BBZ, etc.). The industrial computing device data table 960 may also include indications of permissions 964 assigned to each industrial computing device.

The system administrator may assign permissions to an industrial computing device via a user interface on the asset management system server 902. For example, the system administrator may view a profile for the industrial computing device and enter in an identifier for the permission (e.g., a permission ID), select the permission from several of permissions in a drop-down menu, or assign the permission to the industrial computing device in any other suitable manner.

In addition to the permissions assigned to the industrial computing devices, each industrial computing device may have licensed functions 966 or licensed software. For example, the process plant may obtain a license for a software application on one industrial computing device without obtaining the license on other industrial computing device. Accordingly, even if the industrial computing device is granted permission to execute a certain function by the system administrator according to the permissions assigned to the industrial computing device, the industrial computing device may not be able to execute the function if the function is not licensed on the industrial computing device. For example, industrial computing device UI01 is assigned permission 1 which grants industrial computing device UI01 permission to execute calibration functions on Field Device A. However, according to the licensed functions 966 for industrial computing device UI01, industrial computing device UI01 is not licensed to execute calibration functions (e.g., the calibration software is not licensed on industrial computing device UI01). Therefore, industrial computing device UI01 will not run the calibration software to calibrate Field Device A.

While the example industrial computing devices data table 960 includes industrial computing device ID 962, permissions 964, and licensed functions 966 data fields, additional, fewer, or alternative data fields may be included for each industrial computing device. For example, the industrial computing devices data table 960 may also include a location data field indicating the location within the process plant in which the industrial computing device is stored when not in use. Additionally, the industrial computing devices data table 960 may include a make and model of the industrial computing device, system information for the industrial computing device, etc.

In some embodiments, the asset management server 902 may periodically transmit data from each of the data tables 940, 950, 960 as shown in FIGS. 14A-14C to the industrial computing devices in the process plant, at least insofar as they pertain to each industrial computing device. When a user attempts to access one of the industrial computing devices, the industrial computing device may perform validation/authentication of the user. If the user is authenticated, the industrial computing device may determine a level of authorization for the user using the data.

FIGS. 15-18 are flowcharts depicting processes of the tool 700, the tool communication server 910 and the tool dynamic shared library 916 for communications between the tool 700 and a field device 924. In the following example, the tool 700 communicates with the tool communication server 910 via the process control messaging network 200 and utilizes the process control messaging services to communicate with the field device 924 using the process control messaging system architecture described above. As such, the tool 700 is able to communicatively couple to the field device 924, send commands to the field device 924, receive responses from the field device 924 and disconnect from the field device 924 using the digital process communication channel of the process control system (e.g., the communication system from the asset management system stations 902, 920 and the field devices 904, 924).

Figure 15:
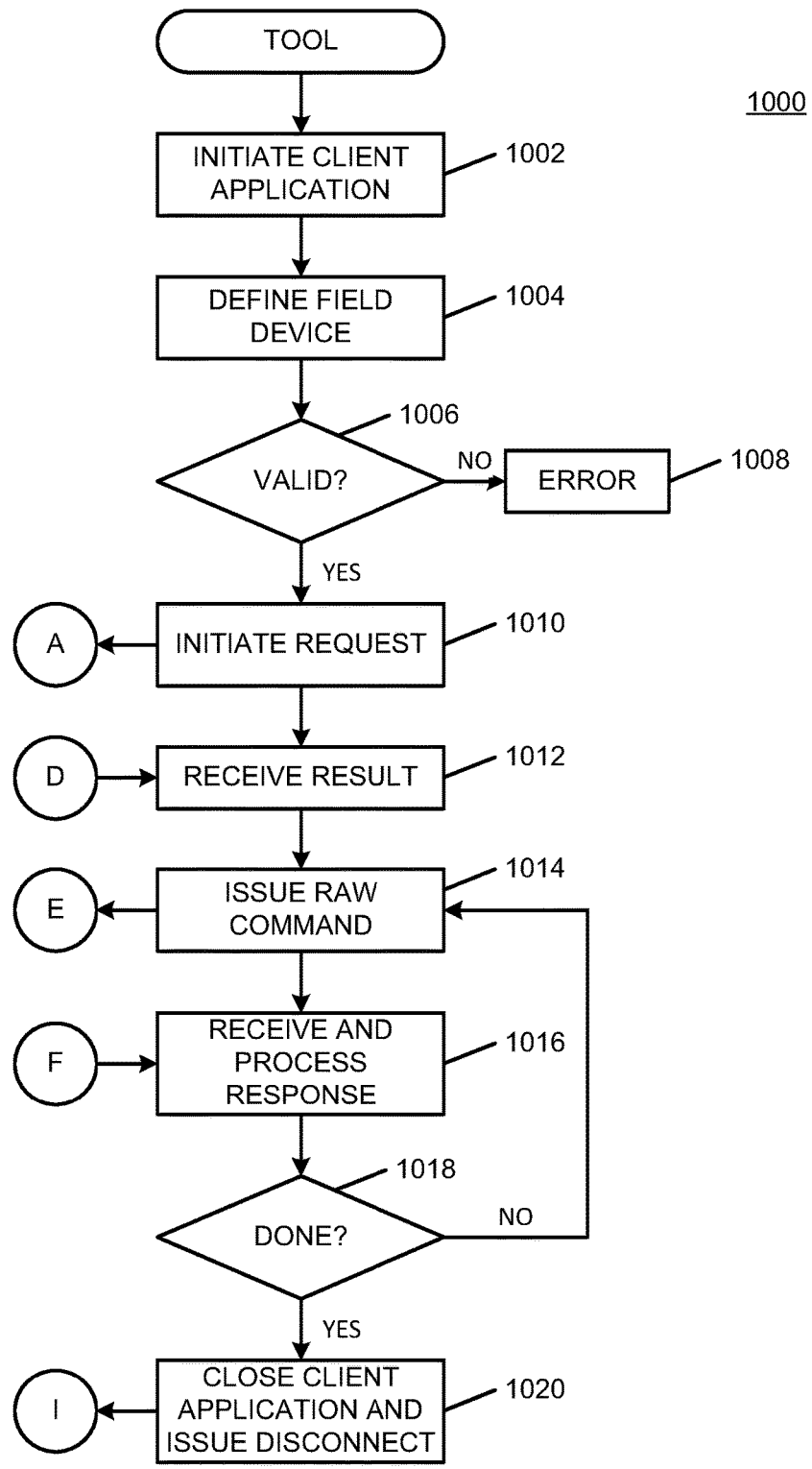
FIG. 15 is a flowchart of an example process for a portable field maintenance tool to communicate with a field device via a process control system.

Referring to FIG. 15, a tool connection and communication process (the "tool process 1000") is executed by the tool 700, in which a client application 864 stored in a memory 824 of the tool 700 is initiated at block 1002. Once the client application 864 is communicatively coupled to the field device, the client application 864 issues raw commands to control the field device. Generally speaking, a raw command to the field device is a command in the native language or protocol of the field device. For example, if the field device is a HART® field device, the raw command to the field device is a HART command (i.e., a command in the HART® communication protocol). Similarly, if the field device is a Foundation® Fieldbus device, the raw command to the field device is a Foundation® Fieldbus comment (i.e., a command in the Foundation® Fieldbus communication protocol).

In one example, the client application 864 is a dedicated application for controlling a selected field device via the digital process communication channel of the process control system, where the application 864, at a minimum, is able to issue the raw commands (read and/or write) for the selected field device. In another example, the client application 864 is a clone of an asset management application executed by the asset management server 902. In effect, the tool 700 is a client station acting as an asset management server station that executes the asset management application clone, but uses the active communicator 804 and the wireless communication interface 812 for indirect communication with the field device via the digital process communication channel connecting the AMS 900 to the field devices, rather than an interface for direct connection and communication with the field device, such as the physical communication interface 806.

Using the client application 864 and/or another application, such as the UI manager 866, the tool process 1000 generates a user interface on the display 722 in order to define the field device 924 at block 1004. In another embodiment, prior to, or on conjunction with, generating a display to define or select the field device 924, the tool process 1000 may generate a user interface on the display 722 in order to define the asset management system the tool is to connect with, particularly where the tool 700 may be authorized to connect with multiple asset management systems. However, it may be the case that the user and/or the tool 700 is only authorized to connect to one asset management system, in which case the tool process 700 may default to that asset management system.

Generally speaking, the tool 700 has registered and/or enrolled by the time the client application 864 has initiated at block 1002 using the registration and/or enrollment processes described above. Further, the tool 700 has an identification and authorization(s) of the user to access the tool 700. Accordingly, the tool 700 has the permissions assigned to the user and/or the tool 700, and the permissions dictate which field devices the user and/or the tool 700 are authorized to connect to and communicate with. As such, the client application 864 may display only those field devices on the display 722 for which the user and/or tool 700 have associated permissions/authorizations. In another example, the client application 864 displays field devices based on a level of permitted access to a particular field device (e.g., communication, control, commission, diagnose, etc.), such that, only those field devices that the user and/or tool 700 are authorized to communicate with are displayed, only those field devices that the user and/or tool 700 are authorized to control are displayed, only those field devices that the user and/or the tool 700 are authorized to commission are displayed, etc. In another example, the client application 864 may prompt for entry of a device identification, such as a process control device tag which uniquely identified the field device, in order to specifically define the field device for communication with the tool 700. In any event, in order to allow a field device to be defined for communication 1004, the display of the field devices is selectable and/or field devices are identifiable via the tool 700 (e.g., via cursor, physical keys, touchscreen, etc.).

At block 1006, the tool process 1000 authenticates/validates the user and the tool prior to any communication between the tool 700 and the asset management system 900. In particular, the tool process 1000 determines whether the tool 700 has been registered with the selected asset management system 900 (e.g., based on the aforementioned registration of the tool 700 with the asset management system). In addition, the tool process 1000 may determine whether the user has the correct level of access/authorization to the selected field device 924 based on the aforementioned registration and/or enrollment with the asset management system 900. If either of these conditions are not met, the tool process 1000 may return an error at block 1008 to the user interface on the tool 700.

For example, when the tool 700 is to connect to a process control device (e.g., field device 924), the tool 700 may retrieve from memory 824, an identifier, such as a device ID which uniquely identifies the process control device (e.g., Field Device A, Field Device B, etc.) from the user via the user interface 810. In some embodiments, the tool 700 may obtain a user ID for the user during the enrollment process. Then, the tool may retrieve a set of permissions for the user and for the tool 700 from the user data table 950 and the tool data table 960 (each of which may be stored in the memory 824 insofar as the user data and tool data are relevant to the particular tool 700), respectively, using the user ID and tool ID.

In any event, the tool 700 may identify the permissions that are assigned to the user and/or the tool 700 and which specify a level of access to the process control device connected to the Industrial computing device. If none of the permissions specify a level of access to the process control device, the tool 700 determines that the user does not have access to the process control device. Accordingly, the tool 700 does not allow the user to communicate with the process control device at block 1008. In some embodiments, the tool 700 may display a message via the user interface 810 indicating that the user is denied access to the connected process control device. The message may provide an explanation as to why the user is denied access (e.g., the user does not have permission to access the process control device, the tool does not have permission to access the process control device, or both the user and the tool do not have permission to access the process control device). The message may also provide instructions for gaining access to the process control device, such as instructions to retrieve a tool which has permission to access the process control device, or instructions for contacting the system administrator.

On the other hand, if one or more permissions specify a level of access to the process control device, the tool 700 determines the type of access that the user and/or tool 700 may have and the functions the user and/or tool 700 are allowed to perform. The tool 700 may also identify an area in which the user has access to the connected process control device. In some embodiments, the tool 700 may determine its location via a positioning sensor, such as a global positioning system (GPS). The tool 700 may then determine whether the location is within the area in which the user has access to the connected process control device. Further, the tool 700 identifies a time duration/schedule for the access and may periodically compare the difference between the current time and the start time of the access to the time duration/schedule.

Provided the tool 700 and/or user are validated at block 1006, the tool process 1000 initiates a connection request at block 1010 to the asset management system 900 via the wireless communication channel of the process control messaging network (e.g., via the wireless access point 720). More particularly, the connection request informs the asset management system 900 that the tool 700 and/or user is requesting read and/or write access to the field device 924 via the digital process communication channel. As such, the connection request may include the field device ID (e.g., the device tag), the user ID (e.g., identification unique to the user) and the tool 700 ID (e.g., identification unique to the tool 700).

As part of initiating the request to the asset management system 900 at block 1010, the tool 700 utilizes the process control messaging architecture 914 to wrap the request in the protocol of the process control messaging service. In one embodiment, the active communicator 804 may wrap the request in the protocol of the process control messaging service, such that the request (e.g., the field device ID, user ID and tool ID) forms the payload of a packet in the protocol of the process control messaging service, with the process control messaging service protocol having a header with information on the network address or identification of the tool communication server 910. The request is then transmitted by the wireless communication interface 812 via the wireless communication channel of the asset management system 900 to the tool communication server 910 using the transport protocol of the wireless communication channel, where the tool communication server 910 has a well-known network identification or address that is thus known to the tool 700.

Figure 16:
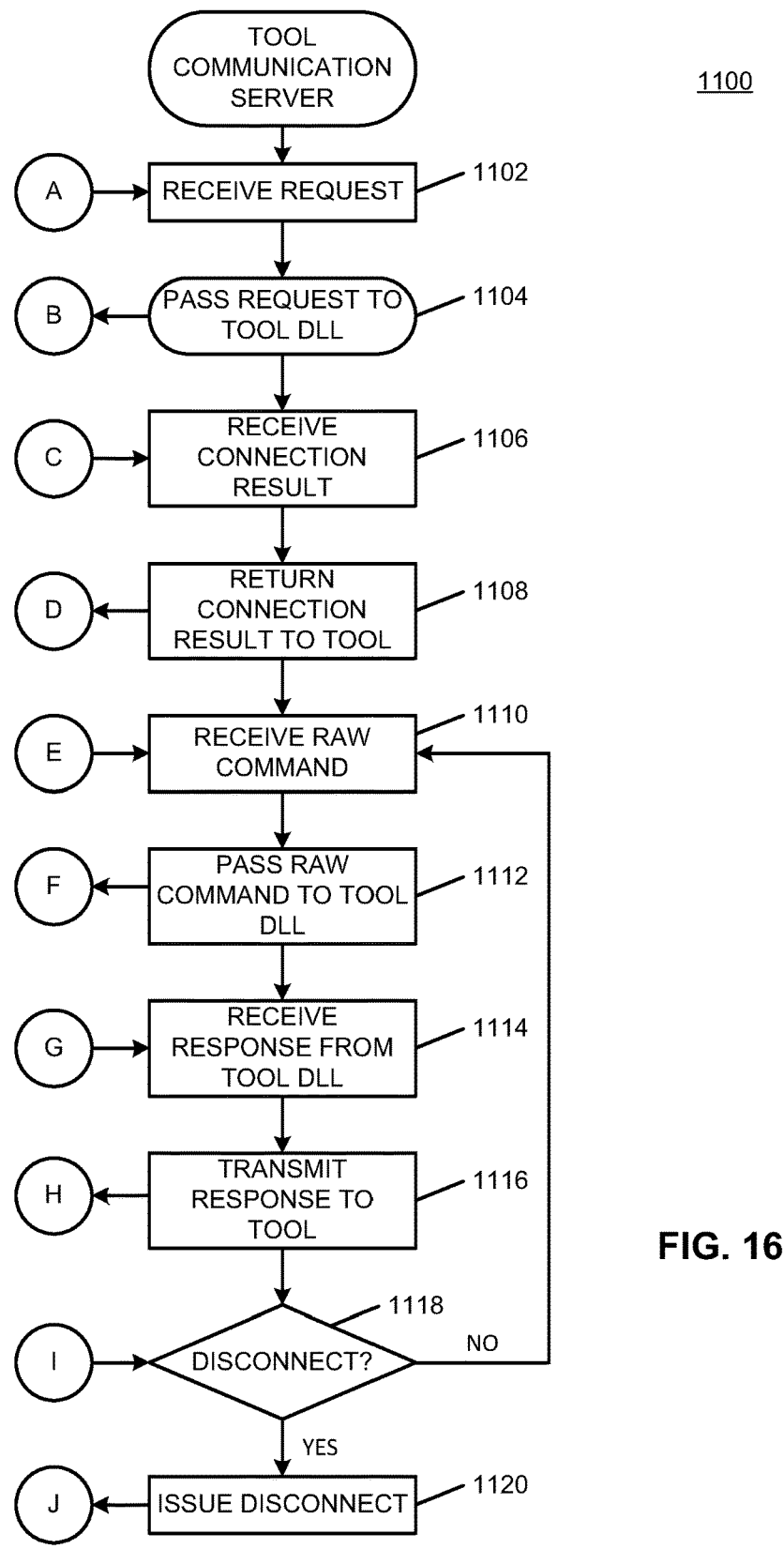
FIG. 16 is a flowchart of an example process for a tool communication server within an asset management system to enable a portable field maintenance tool to communicate with a field device via a process control system.

Referring now to FIG. 16, in a tool communication server connection and communication process 1100 (the "tool communication server process 1100"), the tool communication server 910 receives the connection request from the tool 700 via the process control messaging network at block 1102. As mentioned above, the tool communication server 910 allows the tool 700 to communicate with the asset management system 900. In particular, the tool communication server 910 includes the process control messaging system architecture 912. Like the process control messaging system architecture 914 in the tool 700, the process control messaging system architecture 912 for the tool communication server 910 is represented as a layer of abstraction having a dedicated communication protocol of the process control messaging service above the network communication protocol, and a process control communication protocol layered above the communication protocol of the process control messaging service. Using the process control messaging system architecture 912, the tool communication server 910 unwraps the connection request from the protocol of the process control messaging service, or otherwise extracts the connection request from the process control messaging service packet. The tool communication server 910 may then pass the connection request to the tool dynamic shared library 916, such as an asset management system tool dynamic link library 916 ("tool DLL 916"), at block 1104.

Figure 17:
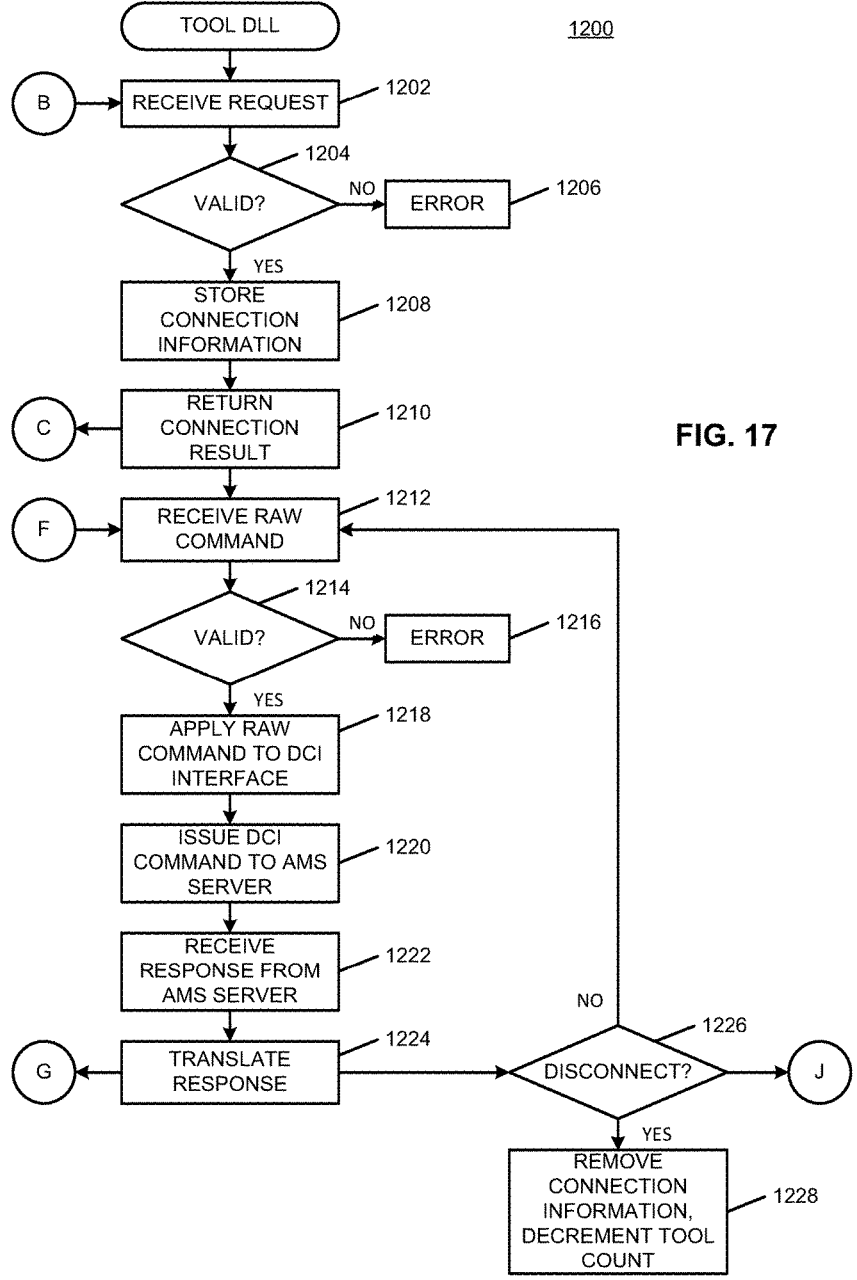
FIG. 17 is a flowchart of an example process for a tool digital shared library within an asset management system to enable a portable field maintenance tool to communicate with a field device via a process control system.

Referring now to FIG. 17, in a tool DLL connection and communication process 1200 (the "tool DLL process 1200"), the tool DLL 916 receives the connection request from the tool communication server process 1100 at block 1202. Using the tool validator 918, at block 1204 the tool DLL process 1200 authenticates/validates the user and the tool 700 prior to any communication between the tool 700 and the field device 924. In particular, the tool DLL process 1200 determines whether the tool 700 has been registered with the asset management system 900, and may determine whether the user has the correct level of access/authorization to the selected field device 924 based on the aforementioned registration and/or enrollment with the asset management system 900 (e.g., at least read access to the field device). If either of these conditions are not met, the tool DLL process 1200 may return an error at block 1206 to the tool communication server 910, which, in turn, returns the error to the tool 700, which may display the error on the user interface on the tool 700. In one embodiment, the number of tools 700a-700c that may be connected to the asset management system 900 at any one time may be limited (e.g., due to licensing restrictions, security considerations, etc.). The tool DLL 916 may therefore maintain information on the number of tools communicating with the asset management system 900, and if the connection of the tool identified in the connection request to the asset management system was to exceed that limit, the connection request may be denied by the tool DLL 916 with the error at block 1206 returned.

As an example of the authentication/validation at block 1204, when the tool DLL 916 receives the connection request as passed from the tool communication server 910, the tool validator 918 may retrieve the field device ID, user ID and tool ID from the connection request and pass this information to the tool validator 918. Then, the tool validator 918 may retrieve a set of permissions for the user and for the tool 700 from the user data table 950 and the tool data table 960 (each of which may be stored in the database 908 or in a memory of the tool validator 918), respectively, using the user ID and tool ID.

In any event, the tool validator 918 may identify the permissions that are assigned to the user and/or the tool 700 and which specify a level of access to the process control device. If none of the permissions specify a level of access to the process control device, the tool validator 918 determines that the user does not have access to the process control device. Further, if the permitted number of tools communicating with the asset management system 900 has been met and would be exceeded by the connection of the requesting tool 700, the tool validator 918 determines that the tool 700 does not have access to the process control device. Accordingly, the tool validator 918 returns an error to the tool DLL 916, which, in turn, returns the error to the tool communication server 910, which may, in turn, return the error to the tool 700. The error may provide an explanation as to why the user is denied access (e.g., the user does not have permission to access the process control device, the tool does not have permission to access the process control device, both the user and the tool do not have permission to access the process control device, or the number of tools connected to the asset management system 900 would be exceeded, etc.).

On the other hand, if one or more permissions specify a level of access to the process control device, the tool validator 918 determines the type of access that the user and/or tool 700 may have and the functions the user and/or tool 700 are allowed to perform. The tool validator 918 may also identify an area in which the user has access to the connected process control device. In some embodiments, the tool validator 918 may determine the location of the tool 700 via a positioning sensor, such as a global positioning system (GPS). The tool validator 918 may then determine whether the location is within the area in which the user has access to the connected process control device. Further, the tool validator 918 identifies a time duration/schedule for the access and may periodically compare the difference between the current time and the start time of the access to the time duration/schedule.

As a further part of the validation/authentication at block 1204, the tool DLL 916 may confirm that no other tool is communicating with the process control device identified in the request. For example, connection information for all tools connected to the asset management system 900 may be stored (e.g., in the database 908, in a memory of the tool validator 918, etc.), including the process control device to which each tool is connected. Using the process control device ID provided in the connection request, the tool DLL process 1200 may determine whether another tool is already in communication with the requested process control device. If so, the tool DLL process 1200 returns the error condition at block 1206 to the tool communication server 910.

Provided the tool 700 and/or user are validated at block 1204, the tool DLL process 1200 stores the connection information from the connection request at block 1208. In addition, the tool DLL may increment a count of tool connections with the asset management system 900. Again, the connection information may be stored in the database 908, in a memory of the tool validator 918, etc. The connection information may, at a minimum, include an indication that the process control device is in communication with a tool, thereby preventing any subsequent tools from connecting with the field device 924. In another embodiment, the connection information includes any of the information discussed above with reference to FIGS. 14A-14C.

At block 1210, the tool DLL process returns the result of the connection request to the tool communication server 910. Referring back to FIG. 16, the tool communication server 910 receives the connection result from the tool DLL 916 at block 1106. Using the process control messaging architecture 912 as described above, the tool communication server 910 transmits the connection result to the tool 700 at block 1108. Referring back to FIG. 15, the tool 700, in turn, receives the connection result from the tool communication server 910 at block 1012, and begins issuing raw commands for the field device 924 to the tool communication server 910 at block 1014 using the process control messaging architecture 914.

Referring again to FIG. 16, the tool communication server 910 receives the raw command from the tool 700 at block 1110 and passes the raw command to the tool DLL at block 1112. Referring again to FIG. 17, the tool DLL receives the raw command from the tool communication server 910 at block 1212. Each raw command corresponds to a particular function executed by the user on the tool 700 for the field device 924 to follow. In one embodiment, the tool DLL uses the tool validator 918 to validate that the tool 700 for each raw command received. Similar to block 1204, the tool DLL process determines whether the tool 700 has been registered with the asset management system 900, determines whether the user has the correct level of access/authorization to the selected field device 924 based on the aforementioned registration and/or enrollment with the asset management system 900 (e.g., at least read access to the field device), and may determine that the number of tools 700 communicating with the asset management system 900 does not exceed the number of tools permitted to communicate with the asset management system 900 at any one time. If any of these conditions are not met, the tool DLL process 1200 may return an error at block 1216 to the tool communication server 910, which, in turn, returns the error to the tool 700.

Further, when a user attempts to execute a particular function on the tool 700 to perform an operation on the connected process control device, the tool validator 918 determines whether the user is permitted to access the function. Additionally, the tool validator 918 determines whether the function is licensed on the tool 700. For example, when a user attempts to execute a particular function on the tool 700, the tool 700 may transmit an indication of the function to the tool communication server 910, which may be part of the raw command itself. The tool validator 918 may then determine whether the user has access to the function by retrieving permissions based on the user ID for the user, ID for the tool 700, and/or device ID for the connected process control device. If the user is not permitted to access the function when interacting with the connected process control device and/or the function is not licensed on the tool 700, the tool DLL process 1200 may also return an error at block 1216.

If the user is permitted to access the function and the function is licensed on the tool 700, at block 1218 the tool DLL 916 launches the raw command to the field device via a device communication interface command using a device communication interface/raw command interface, and then issues the device communication interface command to the appropriate system interface (e.g., the plant server 922 of the client station 920) to perform an operation on the connected process control device at block 1220. In particular, the device communication interface is a method that is a layer of abstraction above the application layer that provides a transport or conduit for passing messages between applications and servers. In this example, the device communication interface passes raw commands from the client application on the tool 700 to the system interface 906 as an argument and invokes the argument using the device communication interface. For example, when the raw command is received at the tool DLL 916, the tool DLL 916 calls the device communication interface and provides the raw command as an input to the device communication interface, whereupon the raw command is wrapped by the device communication interface layer to be passed to the system interface 906 for issuance to the field device.

In one embodiment, the device communication interface communicates with field devices in conjunction with a DDS block (not shown). The DDS block is coupled to a device description library (not shown) which stores device descriptions (DDs) for the field devices. The device communication interface uses the DDS block (which accesses the DDs stored in the library) to communicate properly with the field devices so as to read information from, write information to and perform methods on the field devices. During operation, the DDS accesses and interprets a DD associated with a field device in a known manner to provide information about that field device or to provide proper communication with that device.

After issuing a device communication interface command to the field device, the tool DLL 916 receives a response from the field device via the system interface (e.g., status from the connected field device) at block 1222 and translates the response into response information for the tool communication server 910 at block 1224.

Referring again to FIGS. 15 and 16, the tool communication server 910 receives the translated response from the tool DLL 916 at block 1114, and transmits the translated response to the tool 700 at block 1116. The tool 700, in turn, receives the translated response from the tool communication server 910 at block 1016. As indicated at block 1018, this process of communication between the tool 700 and the connected field device 924 continues until the user is finished or when the permitted time for the user ceases. Referring again to FIG. 16, the tool communication server 910 continues to receive raw commands from the tool 700 and pass the raw commands to the tool DLL 916, as well as receive responses from the tool DLL 916 and transmit the responses to the tool 700 as indicated at block 1118. Referring again to FIG. 17, the tool DLL process 1200 continues to receive the raw commands issued from the tool 700, translate the raw commands, issue the translated commands to the connected process control device, receive responses and translate the responses for the tool 700 as indicated at block 1226.

Referring back to FIG. 15, once the user is finished (e.g., by closing the application being executed on the tool), the tool 700 may issue a disconnect signal to the tool communication server 910 at block 1020. Referring back to FIG. 16, the tool communication server 910 receives the disconnect signal from the tool 700 and passes the disconnect signal to the tool DLL 916. Referring back to FIG. 17, the tool DLL 916 receives the disconnect signal from the tool communication server 910 and at block 1228 the tool DLL 916 removes (e.g., deletes, erases, moves, etc.) the connection information related to the communication session between the tool 700 and the field device 924. In addition, the tool DLL 916 decrements the count of tool connections with the asset management system. As such, another tool may communicate with the asset management system 900 and establish a connection with the field device 924.

In some cases, the tool 700 may be used to make changes to the configuration of a field device 760 locally (i.e., at the field device) via a direct connection to the field device using, for example, the physical communication interface 806. In other cases, changes to the user configuration may be made at the tool 700. Whereas the device configuration is the present configuration of the field device at the field device (i.e., local to the field device), a user configuration is a configuration of the field device as set by the user, but which is maintained separate from the field device, where the user configurations may be used to clone the field device (i.e., configure a different field device in an identical manner), maintain a template of the configuration of the device (e.g., for configuring other field devices in a similar, though non-identical manner), maintain a history of the configurations of the field device, etc.

In still other cases, events associated with the tool 700 and/or the field device 760 may be recorded at the tool 700 as part of an audit trail of events, including, but not limited to, a user of the tool 700 launching or closing an application to connect with the asset management system 900, modification of a value in the field device 760 using the tool 700, executing a method on the field device 760 using the tool 700, detection of a status set by the field device 760 (such as a HART® command 48 status, where a field device's response to a HART® command 3 to read all dynamic variables and current from the field device indicates that additional status information is available under HART® command 48), the field device 760 being commissioned/ provisioned (e.g., Fieldbus™ device tag and address assigned, wireless HART device joinkey and network ID assigned), and a user logging on and off of the tool 700. With each of these cases, it is important to share this data (field device configuration, user configuration, audit trail events) with the asset management system 900 or an asset management application. For example, it is important that the commissioning of a field device (e.g., adding a field device to the process control system) or a change in the configuration of a field device be communicated throughout the process control system. Similarly, it is important for the asset management system 900 to know whether a user's configuration has changed and events associated with the tool 700 and/or the field device 760.

At the same time, there may be changes within the asset management system 900, such as changes to a user's security information (e.g., information necessary for a tool 700 to validate whether or not the tool's user can perform an action at a given location, or changes in a data synchronization policy), can affect how a tool 700 functions or the extent to which a user can/should use the tool 700. Thus, it is important for the tool 700 to be aware of these changes in security information.

Figure 18:
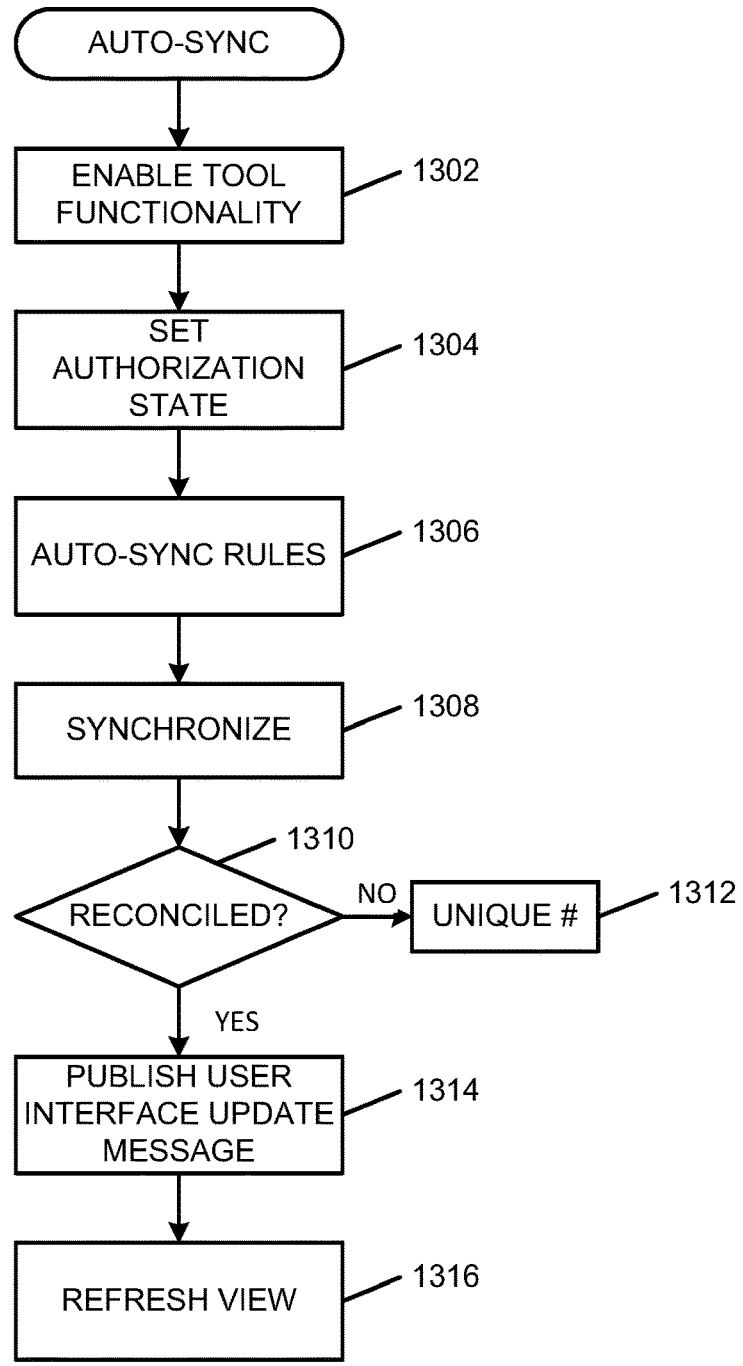
FIG. 18 is a flowchart of an example process for automatically synchronizing sets of data between a portable field maintenance tool and an asset management application.

FIG. 18 is a flowchart depicting a process between the tool 700 and the asset management system 900 for automatic synchronization of information between the tool 700 and the asset management system 900 according to a synchronization policy. Generally speaking, the synchronization policy is a set of rules which define what information may be automatically shared between the tool 700 and the asset management system 900. In the following examples, the synchronization policy will be described with references to field device configurations, user configurations, audit trail events and security settings as mentioned above, but is not limited thereto. For instance, in the following examples, the tool 700 automatically connects to the asset management system 900, during which the tool automatically synchronizes field device configurations, user configurations and audit trail events with the asset management system 900, and the asset management system 900 automatically synchronizes security setting information with the tool 700. In some embodiments, the user has some control over information that is automatically shared. For example, a user may prefer that no data or only particular types of data are automatically synchronized with the asset management system 900, such that the remaining data is manually transferred to the asset management system 900.

Referring to FIG. 18, an automatic synchronization process 1300 is executed by the asset management system 900 to authorize a tool 700 for automatically synchronizing data items (e.g., device configuration, user configuration, audit trail events), also referred to as a "set of data", with the asset management system server 902. Beginning at block 1302, an asset management application, such as AMS Device Manager™, enables the functionality for communicating with the tool 700.

Once the functionality to communicate with the tool 700 is enabled in the asset management application, the asset management application enables an authorization state for the tool 700 defining whether the tool 700 is authorized to synchronize data items with the asset management application or not at block 1304. An authorized tool 700 is considered one with which the asset management application opens a communication session for synchronizing data items, the communication session being a semi-permanent dialogue between the asset management application and the tool 700 to automatically transfer data items (i.e., a set of data) to the tool communication server 910. On the other hand, an unauthorized tool 700 cannot open a communication session with the asset management application, and other than discovery data, the tool 700 is unable to communicate with the asset management application. The authorization state may be persisted globally to all stations within the asset management system (e.g., asset management server station 902 and client station 920).

Typically, the default authorization state is that the tool 700 is unauthorized to synchronize data items with the asset management application. Of course, this authorization state may be changed. In particular, when asset management application becomes aware of the tool 700 through a discovery process, the asset management application may change the authorization for the tool 700 from unauthorized to authorized, and, in the process, specify the level or characteristics of the synchronization authorization for the tool 700. For example, the tool 700 may broadcast discovery data over the process control messaging network 200, where the discovery data is typically basic information advertised by the tool 700, and may include, but is not limited to, the unique identification associated with the tool 700 and its current capabilities (e.g., available for a communication session). If the tool 700 and/or user are validated as having the ability to synchronize data items with the asset management application (e.g., as a functionality that is validated by the tool validator 918 similar to block 1204 of FIG. 17), the asset management application may set the authorization state for the tool 700 to authorized for a communication session. Of course, the authorization state for the tool 700 may also be changed by the asset management application from authorized to unauthorized, in which case any open communication sessions are immediately closed.

At block 1306, the automatic synchronization process 1300 enables automatic synchronization for different data sets (e.g., device configurations, user configurations and audit trail events). Generally speaking, the authorization of sets of data is defined by a set of rules or policy for synchronizing a set of data between a tool 700 and the asset management application during a communication session. The default automatic synchronization policy state for the tool 700 may be to authorize automatic transfer of all type of data sets. Typically, the synchronization policy is persisted globally to all stations within the asset management system, and is applicable to all tools 700a-700c. It is noted, that the synchronization policy may be updated or otherwise changed at the asset management application, though such updates are likewise persistent globally. For example, the automatic synchronization rules may be changed to only automatically synchronize one of device configurations, user configurations or audit trail events from the tools 700. In another example, the automatic synchronization rules may be changed to automatically synchronize additional types of data items, such as security settings from the asset management system to the tools 700.

Having authorized the tool 700 and applied the automatic synchronization rules, the automatic synchronization process 1300 may automatically synchronize data with the tool 700 according to the synchronization rules. This automatic synchronization may be performed any time the tool 700 connects to the process control messaging network 200 and opens a communication session with the asset management application. In particular, the tool 700 connects to the process control messaging network 200, and upon establishing a communication session, automatically transfers the set(s) of data to the tool communication server 912 by wrapping the set of data in the of the process control messaging network protocol and transmitting the set of data via the process control messaging network 200. In response, the tool communication server 912 notifies the asset management application that there is data to be synchronized. In turn, the asset management application initiates the transfer of the set of data from the tool communication server 912 to itself so as to synchronize the set(s) of data from the tool 700 with its own.

It is also noted that such automatic synchronization may be performed in real time as the sets of data are developed. For example, if the tool 700 is currently connected to the process control messaging network 200 and/or has a communication session with the asset management application while the tool 700 is configuring a field device, the device configuration data may be synchronized as above as the configurations are made to the field device. On the other hand, instead of automatically synchronizing a set of data with the asset management application, the set(s) of data may be transferred manually by a user of tool 700. For example, the user may prefer to allow device configurations and audit trail events to automatically synchronize with the asset management application, but wants to only manually transfer user configuration data to the asset management application, which may be a setting provided at the tool 700 and/or persisted to the asset management application.

In some cases, a set of data received by the asset management application needs to be reconciled due to a conflict with existing data. For example, each set of data may be associated with a unique identifier (e.g., a user configuration data item with a unique identifier "File_01"). However, a data item called "File_01" may already exist on the asset management application. In such a case, the existing set of data on the asset management system may be overwritten with the new data or a new unique identification may be provided for the new data item. For example, if the transfer is manual (i.e., the set of data is pushed by the user of the tool 700), the user may be presented with options to resolve the conflict (e.g., choosing to rename the file or overwrite the existing file on the asset management application with the newer version from the tool 700). If the transfer is automatic, the system may automatically provide a new name for the data item, such as by appending a unique number to the file (e.g., "File_01_01"), to ensure the name is unique at block 1212. With an automatic transfer, this may be the default selection as there is no user oversight to determine whether the data should be overwritten.

After reconciling the set of data at block 1310, the automatic synchronization process 1300 publishes a user interface update message at block 1314 to all stations (e.g., client station 920) that the set of data has changed. Thus, each station within the asset management system 900 has the same information as the asset management application. As such, the entire asset management system 900 has the updated information (e.g., device configuration, user configuration, etc.) as needed for the entire asset management system 900 to efficiently execute operations on the process control system. In other words, the asset management system 900 has up-to-date information on the process control system that it manages, including instances where changes are made in the field, thereby providing the asset management system 900 with an accurate view of the process control system. A more accurate depiction of the process control system including the changes in the set(s) of data allows the asset management system 900 to make better decisions when executing operations on the process control system Additionally, the automatic synchronization process 1300 refreshes the user interfaces at various stations at block 1316, so that operators (users) at the stations have a more accurate view of the process control system, particularly as such views are displayed on the user interface that may be affected by the change in the set of data.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

The invention claimed is:

1. A method of data synchronization between a portable field maintenance tool and a process control asset management system application within a process control system, the method comprising:
   automatically transferring, by the portable field maintenance tool, a set of data to a portable field maintenance tool communication server within the process control asset management system via a wireless communication channel of the process control asset management system in response to a change in the set of data, wherein the process control asset management system is communicatively coupled to a field device via a digital process communication channel, wherein the set of data is defined by a set of rules for automatic synchronization of the set of data between the portable field maintenance tool and the process control asset management system application during a communication session between the portable field maintenance tool and the process control asset management system application, wherein the portable field maintenance tool and the portable field maintenance tool communication server each have a framework of a communication protocol of the field device layered above a communication protocol of the process control asset management system, and the protocol of the process control asset management system layered above a network communications protocol, and wherein the set of data is wrapped in the communication protocol of the process control asset management system;
   notifying, by the portable field maintenance tool communication server in response to the automatic transfer of the set of data, the process control asset management system application that the set of data from the portable field maintenance tool communication server is ready to synchronize with the process control asset management system application;
   initiating, by the process control asset management system application in response to the notice, a transfer of the set of data from the portable field maintenance tool communication server to the process control asset management system application to synchronize a set of the data in the process control asset management application with the set of data from the portable field maintenance tool;
   publishing, by the process control asset management system application in response to a completion of the transfer of the set of data, a user interface update message to a plurality of process control asset management system stations that the set of data has changed;
   refreshing, by the user interface on one or more of the plurality of process control asset management stations, a display view affected by the change in the set of data; and
   executing, by the process control asset management system, an operation of the process control system involving the change in the set of data.

2. The method of claim 1, further comprising:
   automatically communicatively coupling the portable field maintenance tool to the portable field maintenance tool communication server via the wireless communication channel in response to a change in the set of data on the portable field maintenance tool,
   wherein automatically transferring the set of data comprises automatically transferring, by the portable field maintenance tool, the set of data to the portable field maintenance tool communication server within the process control asset management system via the wireless communication channel of the process control system upon communicatively coupling the portable field maintenance tool to the portable field maintenance tool communication server.

3. The method of claim 1, further comprising:
   broadcasting, by the portable field maintenance tool, discovery data over the wireless communication channel, wherein the discovery data comprises a unique identification of the portable field maintenance tool;
   setting, by the process control asset management application in response to receiving the discovery data, an authorization state for the portable field maintenance tool from: (1) unauthorized to automatically transfer the set of data to the portable field maintenance tool connection server to (2) authorized to automatically transfer the set of data to the portable field maintenance tool connection server; and
   persisting, by the process control asset management application, the authorization state of the portable field maintenance tool to the plurality of process control asset management stations.

4. The method of claim 1, wherein the set of data comprises one or more of: a user configuration representing a configuration of the field device maintained separate from the field device, an audit trail event representing a recordation of an event involving the field device and/or the portable field maintenance tool, a security setting representing a security setting involving the portable field maintenance tool and/or a user of the portable field maintenance tool, and a field device configuration representing a configuration of the field device local to the field device.

5. The method of claim 4, wherein automatically transferring a set of data comprises automatically transferring, by the portable field maintenance tool, a user configuration to the portable field maintenance tool communication server in response to a change in the user configuration of the field device.

6. The method of claim 4, wherein automatically transferring a set of data comprises automatically transferring, by the portable field maintenance tool, an audit trail event to the portable field maintenance tool communication server in response to an occurrence of the event involving the field device and/or the portable field maintenance tool.

7. The method of claim 6, wherein the event comprises one or more of the following: a client application on the portable field maintenance tool being launched or closed, wherein the client application interfaces with the process control asset management system, a value modified in the field device, a method executed on the field device, detection of a status set by the field device, a commissioning of the field device and a user logging on or off of the portable field maintenance tool.

8. The method of claim 4, wherein automatically transferring a set of data comprises automatically transferring, by the portable field maintenance tool, a security setting to the portable field maintenance tool communication server in response to a change in the security setting involving the portable field maintenance tool and/or a user of the portable field maintenance tool.

9. The method of claim 4, wherein automatically transferring a set of data comprises automatically transferring, by the portable field maintenance tool, a field device configuration to the portable field maintenance tool communication server in response to a change in the local configuration of the field device.

10. The method of claim 4, further comprising enabling or disabling synchronization of one or more of the user configuration, audit trail event, security setting and field device configuration.

11. The method of claim 1, wherein automatically transferring the set of data to the portable field maintenance tool communication server comprises automatically transferring the set of data to the portable field maintenance tool communication server as changes are made to the set of data if the portable field maintenance tool is already in communication with the portable field maintenance tool communication server.

12. The method of claim 1, wherein automatically transferring the set of data to the portable field maintenance tool communication server comprises automatically transferring the set of data to the portable field maintenance tool communication server upon communications being established between the portable field maintenance tool and the portable field maintenance tool communication server if changes are made to the set of data when the portable field maintenance tool is not in communication with the portable field maintenance tool communication server.

13. A system for synchronizing a set of data between a portable field maintenance tool and a process control asset management system application within a process control system, the system comprising:
 a portable field maintenance tool communication server; and
 a process control asset management system application communicatively coupled to the portable field maintenance tool communication server,
 wherein the portable field maintenance tool communication server is:
 adapted to communicatively couple to the portable field maintenance tool via a wireless communication channel, and
 adapted to receive a set of data from the portable field maintenance tool via the wireless communication channel, the set of data defined by a set of rules for automatic synchronization of the set of data between the portable field maintenance tool and the process control asset management system application during a communication session between the portable field maintenance tool and the process control asset management system application, the portable field maintenance tool and the portable field maintenance tool communication server each having a framework of a communication protocol of the field device layered above a communication protocol of the process control asset management system, and the protocol of the process control asset management system layered above a network communications protocol, and wherein the set of data is wrapped in the communication protocol of the process control asset management system, and
 adapted to automatically notify the process control asset management system application that the set of data from the portable field maintenance tool communication server is ready to synchronize with the process control asset management system application upon receipt of the set of data from the portable field maintenance tool;
 wherein the process control asset management system application is:
 adapted to automatically initiate a transfer of the set of data from the portable field maintenance tool communication server to the process control asset management system application to synchronize a set of the data in the process control asset management application with the set of data from the portable field maintenance tool upon receipt of the notification,
 adapted to publish a user interface update message to a plurality of process control asset management stations that the set of data has changed, and
 adapted to execute an operation of the process control system involving the change in the set of data.

14. The system of claim 13, wherein the portable field maintenance tool communication server is adapted to receive discovery data broadcast by the portable field maintenance tool over the wireless communication channel and pass the discovery data to the process control asset management application, wherein the discovery data comprises a unique identification of the portable field maintenance tool, and
 wherein the process control asset management application is adapted to:
 set an authorization state for the portable field maintenance tool in response to receiving the discovery data from: (1) unauthorized to automatically transfer the set of data to the portable field maintenance tool connection server to (2) authorized to automatically transfer the field device configuration file to the portable field maintenance tool connection server; and
 persist the authorization state of the portable field maintenance tool to the plurality of process control asset management stations.

15. The system of claim 13, wherein the set of data comprises one or more of: a user configuration representing a configuration of the field device maintained separate from the field device, an audit trail event representing a recordation of an event involving the field device and/or the portable field maintenance tool, a security setting representing a security setting involving the portable field maintenance tool and/or a user of the portable field maintenance tool, and a field device configuration representing a configuration of the field device local to the field device.

16. The system of claim 15, wherein the event comprises one or more of the following: a client application on the portable field maintenance tool being launched or closed, wherein the client application interfaces with the process control asset management system, a value modified in the field device, a method executed on the field device, detection of a status set by the field device, a commissioning of the field device and a user logging on or off of the portable field maintenance tool.

17. The system of claim 15, wherein the process control asset management application is adapted to enable or disable synchronization of one or more of the user configuration, audit trail event, security setting and field device configuration.

18. The system of claim 13, wherein the portable field maintenance tool communication server is adapted to receive the set of data as changes are made to the set of data at the portable field maintenance tool if the portable field maintenance tool is already in communication with the portable field maintenance tool communication server.

19. The system of claim 13, wherein the portable field maintenance tool communication server is adapted to receive the set of data to the portable field maintenance tool communication server upon communications being established between the portable field maintenance tool and the portable field maintenance tool communication server if changes are made to the set of data when the portable field maintenance tool is not in communication with the portable field maintenance tool communication server.

20. A portable field maintenance tool comprising:
   a housing;
   a processor disposed within the housing;
   a memory disposed within the housing and operatively coupled to the processor;
   a wireless communication interface disposed within the housing and operatively coupled to the processor and the memory, the communication interface adapted to communicatively couple with a wireless communication channel of a process control asset management system;
   a communication circuit disposed within the housing and communicatively coupled to the wireless communication interface, the communication circuit adapted to encode the communication signal for the wireless communication channel using a framework of a communication protocol of a field device layered above a communication protocol of the process control asset management system, and the protocol of the process control asset management system layered above a network communications protocol; and
   a client application stored on the memory and adapted to, when executed by the processor, automatically transfer a set of data to a portable field maintenance tool communication server within the process control asset management system via a wireless communication channel of the process control asset management system in response to a change in the set of data, wherein the set of data is defined by a set of rules for automatic synchronization of the set of data between the portable field maintenance tool and the process control asset management system application during a communication session between the portable field maintenance tool and the process control asset management system application, and wherein the set of data is wrapped in the communication protocol of the process control asset management system.

21. The portable field maintenance tool of claim 20, wherein the communication circuit is adapted for intrinsically safe operation.

22. The portable field maintenance tool of claim 20, wherein the client application is further adapted to, when executed by the processor:
   automatically communicatively couple the portable field maintenance tool to the portable field maintenance tool communication server via the wireless communication channel in response to a change in the set of data on the portable field maintenance tool,
   wherein the client application is adapted to, when executed by the processor, automatically transfer the set of data to the portable field maintenance tool communication server via the wireless communication channel of the process control system upon communicatively coupling the portable field maintenance tool to the portable field maintenance tool communication server.

23. The portable field maintenance tool of claim 22, wherein the client application is further adapted to, when executed by the processor, broadcast discovery data over the wireless communication channel, wherein the discovery data comprises a unique identification of the portable field maintenance tool.

24. The portable field maintenance tool of claim 22, wherein the set of data comprises one or more of: a user configuration representing a configuration of the field device maintained separate from the field device, an audit trail event representing a recordation of an event involving the field device and/or the portable field maintenance tool, a security setting representing a security setting involving the portable field maintenance tool and/or a user of the portable field maintenance tool, and a field device configuration representing a configuration of the field device local to the field device.

25. The portable field maintenance tool of claim 24, wherein the client application is adapted to, when executed by the processor, automatically transfer a user configuration to the portable field maintenance tool communication server in response to a change in the user configuration of the field device.

26. The portable field maintenance tool of claim 24, wherein the client application is adapted to, when executed by the processor, automatically transfer an audit trail event to the portable field maintenance tool communication server in response to an occurrence of the event involving the field device and/or the portable field maintenance tool.

27. The portable field maintenance tool of claim 24, wherein the event comprises one or more of the following: a client application on the portable field maintenance tool being launched or closed, wherein the client application interfaces with the process control asset management system, a value modified in the field device, a method executed on the field device, detection of a status set by the field device, a commissioning of the field device and a user logging on or off of the portable field maintenance tool.

28. The portable field maintenance tool of claim 24, wherein the client application is adapted to, when executed by the processor, automatically transfer a security setting to the portable field maintenance tool communication server in response to a change in the security setting involving the portable field maintenance tool and/or a user of the portable field maintenance tool.

29. The portable field maintenance tool of claim 24, wherein the client application is adapted to, when executed by the processor, automatically transfer a field device configuration to the portable field maintenance tool communication server in response to a change in the local configuration of the field device.

30. The portable field maintenance tool of claim 24, wherein the client application is further adapted to, when executed by the processor, enable or disable synchronization of one or more of the user configuration, audit trail event, security setting field device configuration sets of data with the process control asset management system application.

31. The portable field maintenance tool of claim 20, wherein the client application is adapted to, when executed by the processor, automatically transfer the set of data to the portable field maintenance tool communication server as changes are made to the set of data if the portable field maintenance tool is already in communication with the portable field maintenance tool communication server.

32. The portable field maintenance tool of claim 20, wherein the client application is adapted to, when executed by the processor, automatically transfer the set of data to the portable field maintenance tool communication server upon communications being established between the portable field maintenance tool and the portable field maintenance tool communication server if changes are made to the set of data when the portable field maintenance tool is not in communication with the portable field maintenance tool communication server.

\* \* \* \* \*